(12) United States Patent
Shimada et al.

(10) Patent No.: US 9,542,249 B2
(45) Date of Patent: Jan. 10, 2017

(54) SYSTEM REDUNDANCY VERIFICATION METHOD AND COMPUTER SYSTEM

(71) Applicant: Hitachi, Ltd., Tokyo (JP)

(72) Inventors: Keita Shimada, Tokyo (JP); Yoshifumi Takamoto, Tokyo (JP); Takashi Tameshige, Tokyo (JP); Yujiro Ichikawa, Tokyo (JP); Tomohito Uchida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 119 days.

(21) Appl. No.: 14/426,279

(22) PCT Filed: Nov. 2, 2012

(86) PCT No.: PCT/JP2012/078453
§ 371 (c)(1),
(2) Date: Mar. 5, 2015

(87) PCT Pub. No.: WO2014/068764
PCT Pub. Date: May 8, 2014

(65) Prior Publication Data
US 2015/0205650 A1    Jul. 23, 2015

(51) Int. Cl.
*G06F 11/00* (2006.01)
*G06F 11/20* (2006.01)

(52) U.S. Cl.
CPC .......... *G06F 11/008* (2013.01); *G06F 11/004* (2013.01); *G06F 11/202* (2013.01); *G06F 11/2023* (2013.01)

(58) Field of Classification Search
CPC . G06F 11/0004; G06F 11/008; G06F 11/2023; G06F 11/2041; H04L 41/0663
See application file for complete search history.

(56) References Cited

U.S. PATENT DOCUMENTS

| 2007/0055853 A1 | 3/2007 | Hatasaki et al. |
| 2009/0150528 A1 | 6/2009 | Tanabe et al. |

FOREIGN PATENT DOCUMENTS

| JP | 5-303509 A | 11/1993 |
| JP | 2007-66216 A | 3/2007 |
| JP | 2007-249343 A | 9/2007 |
| JP | 2009-140194 A | 6/2009 |
| JP | 2011-86316 A | 4/2011 |

*Primary Examiner* — Joseph Kudirka
(74) *Attorney, Agent, or Firm* — Volpe and Koenig, P.C.

(57) ABSTRACT

A system redundancy verification method, which is to be executed in a computer system, the computer system comprising a first computer, a second computer, a storage system, and a management computer, the system redundancy verification method including: a step of obtaining, by the management computer, first hardware information on the first computer and second hardware information on the second computer; a step of obtaining, by the management computer, first storage area information on the storage area; a step of obtaining, by the second computer the second storage area information from the storage system, and a step of comparing, by the management computer, the first hardware information and the first storage area information with the second hardware information and the second storage area information, and determining whether a failover is implementable between the first computer and the second computer.

15 Claims, 28 Drawing Sheets

| SERVER ID 501 | MANAGEMENT IP ADDRESS 502 | MODEL 503 | CONFIGURATION INFORMATION 504 | WWN 505 | LU INFORMATION 506 | RUNNING INFORMATION 507 | CLUSTER ID 508 | TYPE 509 |
|---|---|---|---|---|---|---|---|---|
| SERVER 1 | 1.1.1.10 | A COMPANY SERVER MODEL 1 | Chassis1,Slot1,SMP:No CPU:2GHz/core:4 memory:4GB NIC:1Gbps,HBA:3Gbps | WWN 1 | SERVER1_inquiry1 | RUNNING | CLUSTER 1 | ACTIVE |
| SERVER 2 | 1.1.1.12 | A COMPANY SERVER MODEL 1 | Chassis1,Slot2,SMP:No CPU:2GHz/core:4 memory:4GB NIC:1Gbps,HBA:3Gbps | WWN 2 | SERVER2_inquiry1 SERVER2_inquiry2 | RUNNING | CLUSTER 1 | ACTIVE |
| SERVER 3 | 1.1.1.13 | A COMPANY BLADE SERVER MODEL 2 | Chassis2,Slot1,SMP:No CPU:2GHz/core:4 memory:4GB NIC:1Gbps,HBA:3Gbps | WWN 3 | SERVER3_inquiry | RUNNING | CLUSTER 1 | ACTIVE |
| SERVER 4 | 1.1.1.14 | A COMPANY BLADE SERVER MODEL 1 | Chassis2,Slot2,SMP:No CPU:2GHz/core:4 memory:4GB NIC:1Gbps,HBA:3Gbps | WWN 4 | | STOPPED | CLUSTER 1 | STANDBY |
| SERVER 5 | 1.1.1.15 | A COMPANY BLADE SERVER MODEL 1 | Chassis2,Slot2,SMP:No CPU:2GHz/core:4 memory:4GB NIC:1Gbps,HBA:3Gbps | WWN 5 | | STOPPED | CLUSTER 1 | STANDBY |

| 501 | 502 | 503 | 504 | 505 | 506 | 507 | 508 | 509 |
|---|---|---|---|---|---|---|---|---|
| SERVER ID | MANAGEMENT IP ADDRESS | MODEL | CONFIGURATION INFORMATION | WWN | LU INFORMATION | RUNNING INFORMATION | CLUSTER ID | TYPE |
| SERVER 6 | 1.1.1.21 | B COMPANY BLADE SERVER MODEL 1 | Chassis3,Slot0,SMP:No CPU:2GHz/core:8 memory:16GB NIC:10Gbps,HBA:3Gbps | WWN 6 | SERVER6_inquiry1 | RUNNING | CLUSTER 2 | ACTIVE |
| SERVER 7 | 1.1.1.22 | B COMPANY BLADE SERVER MODEL 2 | Chassis3,Slot1,SMP:No CPU:2GHz/core:8 memory:16GB NIC:10Gbps,HBA:3Gbps | WWN 7 | SERVER7_inquiry1 | RUNNING | CLUSTER 2 | ACTIVE |
| SERVER 8 | 1.1.1.23 | B COMPANY BLADE SERVER MODEL 2 | Chassis4,Slot1,SMP:No CPU:2GHz/core:8 memory:4GB NIC:10Gbps,HBA:3Gbps | WWN 8 | SERVER8_inquiry | RUNNING | CLUSTER 2 | ACTIVE |
| SERVER 9 | 1.1.1.24 | B COMPANY BLADE SERVER MODEL 2 | Chassis5,Slot1,SMP:No CPU:3GHz/core:8 memory:16GB NIC:1Gbps,HBA:3Gbps | WWN 9 | | STOPPED | CLUSTER 2 | STANDBY |
| ... | ... | ... | ... | ... | ... | ... | ... | ... |

250

| PAIR ID 601 | CLUSTER ID 602 | ACTIVE SERVER ID 603 | STANDBY SERVER ID 604 | CHECK FLAG 605 | LU FLAG 606 | VERIFICATION RESULT 607 | REASON 608 | OBTAINED INFORMATION 609 | OBTAINING TIME 610 | PRIORITY 611 |
|---|---|---|---|---|---|---|---|---|---|---|
| CHECK 1 | CLUSTER 1 | SERVER 1 | SERVER 4 | FINISHED | FINISHED | IMPLE-MENTABLE | - | SERVER1_inquiry1 | 7.1 | 2 |
| CHECK 2 | CLUSTER 1 | SERVER 2 | SERVER 4 | FINISHED | FINISHED | IMPLE-MENTABLE | - | SERVER2_inquiry1 SERVER2_inquiry2 | 6.2 | 2 |
| CHECK 3 | CLUSTER 1 | SERVER 3 | SERVER 4 | FINISHED | FINISHED | IMPLE-MENTABLE | - | SERVER3_inquiry1 | 6.5 | 2 |
| CHECK 4 | CLUSTER 1 | SERVER 1 | SERVER 5 | FINISHED | FINISHED | IMPLE-MENTABLE | - | SERVER1_inquiry1 | 1.1 | 1 |
| CHECK 5 | CLUSTER 1 | SERVER 2 | SERVER 5 | FINISHED | FINISHED | IMPLE-MENTABLE | - | SERVER2_inquiry1 SERVER2_inquiry2 | 0.8 | 1 |

*Fig. 6A*

| PAIR ID 601 | CLUSTER ID 602 | ACTIVE SERVER ID 603 | STANDBY SERVER ID 604 | CHECK FLAG 605 | LU FLAG 606 | VERIFICATION RESULT 607 | REASON 608 | OBTAINED INFORMATION 609 | OBTAINING TIME 610 | PRIORITY 611 |
|---|---|---|---|---|---|---|---|---|---|---|
| CHECK 6 | CLUSTER 1 | SERVER 3 | SERVER 5 | FINISHED | FINISHED | IMPLEMENTABLE | - | SERVER3_inquiry1 | 0.9 | 1 |
| CHECK 7 | CLUSTER 2 | SERVER 6 | SERVER 9 | FINISHED | FINISHED | NOT IMPLEMENTABLE | NOT ACCESSIBLE TO LU | | . | . |
| CHECK 8 | CLUSTER 2 | SERVER 7 | SERVER 9 | FINISHED | FINISHED | NOT IMPLEMENTABLE | NOT ACCESSIBLE TO LU | | . | . |
| CHECK 9 | CLUSTER 2 | SERVER 8 | SERVER 9 | FINISHED | FINISHED | NOT IMPLEMENTABLE | NOT ACCESSIBLE TO LU | | . | . |
| ... | ... | ... | ... | ... | ... | ... | ... | ... | ... | ... |

Fig. 6B

| PAIR ID 601 | CLUSTER ID 602 | ACTIVE SERVER ID 603 | STANDBY SERVER ID 604 | CHECK FLAG 605 | LU FLAG 606 | VERIFICATION RESULT 607 | REASON 608 | OBTAINED INFORMATION 609 | OBTAINING TIME 610 | STORAGE ID 1901 | STORAGE PORT ID 1902 | PRIORITY 611 |
|---|---|---|---|---|---|---|---|---|---|---|---|---|
| CHECK 1 | CLUSTER 1 | SERVER 1 | SERVER 4 | ON | ON | IMPLE-MENTABLE | - | SERVER1_inquiry1 | 7.1 | STORAGE 1 | PORT 1 | 2 |
| CHECK 2 | CLUSTER 1 | SERVER 2 | SERVER 4 | ON | ON | IMPLE-MENTABLE | - | SERVER2_inquiry1 SERVER2_inquiry2 | 6.2 | STORAGE 1 | PORT 1 | 2 |
| CHECK 3 | CLUSTER 1 | SERVER 3 | SERVER 4 | ON | ON | IMPLE-MENTABLE | - | SERVER3_inquiry1 | 6.5 | STORAGE 1 | PORT 1 | 2 |
| CHECK 4 | CLUSTER 1 | SERVER 1 | SERVER 5 | ON | ON | IMPLE-MENTABLE | - | SERVER1_inquiry1 | 1.1 | STORAGE 1 | PORT 2 | 1 |
| CHECK 5 | CLUSTER 1 | SERVER 2 | SERVER 5 | ON | ON | IMPLE-MENTABLE | - | SERVER2_inquiry1 SERVER2_inquiry2 | 0.8 | STORAGE 1 | PORT 2 | 1 |

*Fig. 19A*

| 601 | 602 | 603 | 604 | 605 | 606 | 607 | 608 | 609 | 610 | 1901 | 1902 | 611 |
|---|---|---|---|---|---|---|---|---|---|---|---|---|
| PAIR ID | CLUSTER ID | ACTIVE SERVER ID | STANDBY SERVER ID | CHECK FLAG | LU FLAG | VERIFICATION RESULT | REASON | OBTAINED INFORMATION | OBTAINING TIME | STORAGE ID | STORAGE PORT ID | PRIORITY |
| CHECK 6 | CLUSTER 1 | SERVER 3 | SERVER 5 | ON | ON | IMPLE-MENTABLE | - | SERVER3_inquiry1 | 0.9 | STORAGE 1 | STORAGE PORT 2 | 1 |
| CHECK 7 | CLUSTER 2 | SERVER 6 | SERVER 9 | ON | ON | NOT IMPLE-MENTABLE | NOT ACCESSIBLE TO LU | - | - | STORAGE 1 | STORAGE PORT 3 | - |
| CHECK 8 | CLUSTER 2 | SERVER 7 | SERVER 9 | ON | ON | NOT IMPLE-MENTABLE | NOT ACCESSIBLE TO LU | - | - | STORAGE 1 | STORAGE PORT 3 | - |
| CHECK 9 | CLUSTER 2 | SERVER 8 | SERVER 9 | ON | ON | NOT IMPLE-MENTABLE | NOT ACCESSIBLE TO LU | - | - | STORAGE 1 | STORAGE PORT 3 | - |
| ... | ... | ... | ... | ... | ... | ... | ... | ... | ... | ... | ... | ... |

Fig. 19B

| PAIR ID 601 | CLUSTER ID 602 | ACTIVE SERVER ID 603 | STANDBY SERVER ID 604 | ... | OBTAINED INFORMATION 609 | OBTAINING TIME 610 | STORAGE ID 1901 | PORT ID 1902 | PATH COST 2101 | PRIORITY 611 |
|---|---|---|---|---|---|---|---|---|---|---|
| CHECK 1 | CLUSTER 1 | SERVER 1 | SERVER 4 | ... | SERVER1_inquiry1 | 7.1 | STORAGE 1 | PORT 1 | 200 | 2 |
| CHECK 2 | CLUSTER 1 | SERVER 2 | SERVER 4 | ... | SERVER2_inquiry1 SERVER2_inquiry2 | 6.2 | STORAGE 1 | PORT 1 | 200 | 2 |
| CHECK 3 | CLUSTER 1 | SERVER 3 | SERVER 4 | ... | SERVER3_inquiry1 | 6.5 | STORAGE 1 | PORT 1 | 200 | 2 |
| CHECK 4 | CLUSTER 1 | SERVER 1 | SERVER 5 | ... | SERVER1_inquiry1 | 1.1 | STORAGE 1 | PORT 2 | 100 | 1 |
| CHECK 5 | CLUSTER 1 | SERVER 2 | SERVER 5 | ... | SERVER2_inquiry1 SERVER2_inquiry2 | 0.8 | STORAGE 1 | PORT 2 | 1000 | 1 |

| PAIR ID 601 | CLUSTER ID 602 | ACTIVE SERVER ID 603 | STANDBY SERVER ID 604 | ... | OBTAINED INFORMATION 609 | OBTAINING TIME 610 | STORAGE ID 1901 | STORAGE PORT ID 1902 | PATH COST 2101 | PRIORITY 611 |
|---|---|---|---|---|---|---|---|---|---|---|
| CHECK 6 | CLUSTER 1 | SERVER 3 | SERVER 5 | ... | SERVER3_inquiry1 | 0.9 | STORAGE 1 | STORAGE PORT 2 | 200 | 1 |
| CHECK 7 | CLUSTER 2 | SERVER 6 | SERVER 9 | ... | - | - | STORAGE 1 | STORAGE PORT 3 | - | - |
| CHECK 8 | CLUSTER 2 | SERVER 7 | SERVER 9 | ... | - | - | STORAGE 1 | STORAGE PORT 3 | - | - |
| CHECK 9 | CLUSTER 2 | SERVER 8 | SERVER 9 | ... | - | - | STORAGE 1 | STORAGE PORT 3 | - | - |
| ... | ... | ... | ... | ... | ... | ... | ... | ... | ... | ... |

*Fig. 21B*

SYSTEM REDUNDANCY VERIFICATION METHOD AND COMPUTER SYSTEM

BACKGROUND OF THE INVENTION

This invention relates to a technology for determining, in a computer system in which clusters are built, whether or not a failover function runs without affecting a running computer.

A related-art cluster system having a failover function includes an active server, on which an application for executing a service runs, and a standby server for running the application in place of the active server in a case where a failure occurs on the active server. See, for example, Japanese Patent Application Laid-open No. 2007-249343. As a method of verifying whether or not the failover function runs in the related-art cluster system, it is necessary to verify the following two points.

(Verification 1) A configuration (such as a type of a blade and I/O device) of the active server matches that of the standby server.

(Verification 2) The standby server is accessible to a logical unit (LU) accessed by the active server.

In particular, in order to carry out (Verification 2), it is necessary to verify not only whether or not the standby server is physically coupled (connected) to the LU accessed by the active server but also whether or not a logical coupling is established between the standby server and the LU. As used herein, the logical coupling refers to a setting of a switch for coupling the LU accessed by the active server and the standby server, and various settings made in a storage apparatus such as settings of a port and a path.

In the related-art method of verifying whether or not the failover function runs in the cluster system, it is therefore necessary to actually execute failover processing after the cluster system is built, to thereby verify whether or not the failover function runs normally.

SUMMARY OF THE INVENTION

The above-mentioned related art is a method for preventing, in the cluster system including the active server and the standby server in which the path is not duplicated, a duplex failure responsible for a system down such as failures of both systems of the active server and the standby server, and the method involves issuing a monitoring I/O from the standby server to a shared disk to determine whether or not a failure occurs on the path.

However, with the related art, it is necessary to install a monitoring module, an operating system (OS), and cluster software onto the standby server. Accordingly, the standby server that is not provided in advance with the LU serving as a system disk cannot determine a path.

In addition, with the related art, it is necessary to actually execute the failover processing, and hence a running service needs to be stopped. There has therefore been a demand for a method of verifying whether or not the failover function runs without affecting the running service.

The present invention can be appreciated by the description which follows in conjunction with the following figures, wherein: a system redundancy verification method, which is to be executed in a computer system, the computer system comprising at least one first computer, at least one second computer, a storage system, and a management computer for managing the at least one first computer and the at least one second computer. The at least one first computer includes a first processor, a first memory coupled to the first processor, and a first I/O interface coupled to the first processor. The at least one second computer includes a second processor, a second memory coupled to the second processor, and a second I/O interface coupled to the second processor. The storage system includes a disk controller and a plurality of storage media, the disk controller including at least one controller each including at least one port. The management computer includes a third processor, a third memory coupled to the third processor, and a third I/O interface coupled to the third processor. The at least one first computer is configured to execute a service. The at least one second computer is configured to take over the service, in a case where a failure occurs on the at least one first computer. The storage system is configured to provide the at least one first computer with a storage area for storing data necessary for executing the service. The system redundancy verification method includes: a first step of obtaining, by the management computer, first hardware information on a hardware configuration of the at least one first computer and second hardware information on a hardware configuration of the at least one second computer; a second step of obtaining, by the management computer, first storage area information on the storage area provided to the at least one first computer; a third step of transmitting, by the management computer, an instruction to obtain second storage area information on the storage area provided to the at least one first computer to the at least one second computer; a fourth step of obtaining, by the at least one second computer, in a case of receiving the obtaining instruction, the second storage area information from the storage system, and transmitting the obtained second storage area information to the management computer; and a fifth step of comparing, by the management computer, the obtained first hardware information and the obtained first storage area information with the obtained second hardware information and the obtained second storage area information, and determining whether a failover is implementable between the at least one first computer and the at least one second computer based on a result of the comparison.

According to one embodiment of this invention, it is determined whether or not the failover is implementable by comparing the information obtained from the first computer with the information obtained from the second computer, and hence the service executed by the first computer is not affected.

Objects, configurations, and effects other than those described above become apparent from the following descriptions of embodiments of this invention.

BRIEF DESCRIPTION OF THE DRAWINGS

The present invention can be appreciated by the description which follows in conjunction with the following figures, wherein:

FIGS. 5A and 5B are explanatory diagrams illustrating an example of a management target table according to the first embodiment of this invention;

FIGS. 6A and 6B are explanatory diagrams illustrating an example of a cluster check table according to the first embodiment of this invention;

FIGS. 19A and 19B are explanatory diagrams illustrating an example of the cluster check table according to a sixth embodiment of this invention;

FIGS. 21A and 21B are explanatory diagrams illustrating an example of the cluster check table according to a seventh embodiment of this invention;

DETAILED DESCRIPTION OF THE PREFERRED EMBODIMENTS

Now, a description is given of one embodiment of this invention with reference to the accompanying drawings.

<First Embodiment>

Figure 1:
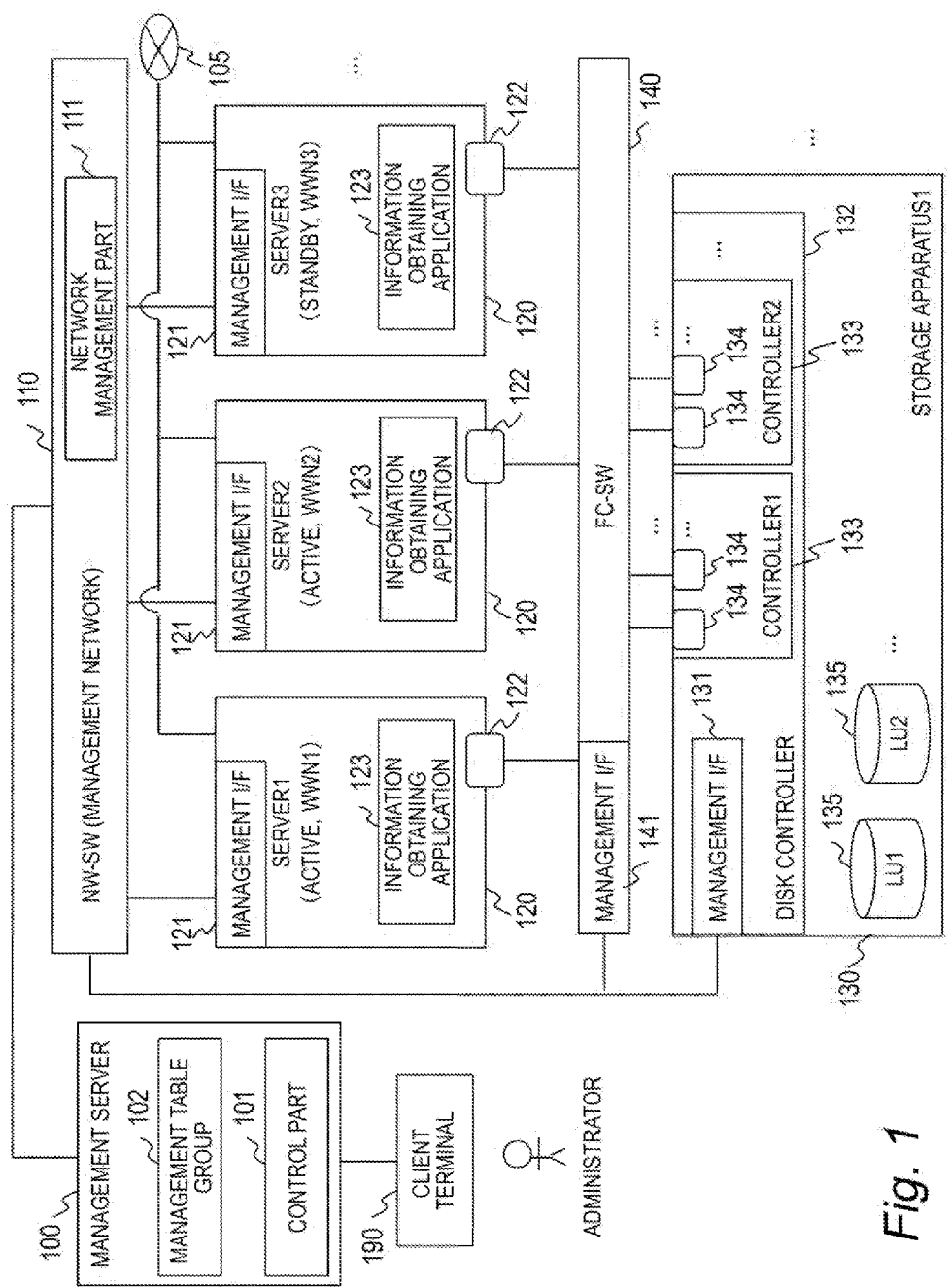
FIG. 1 is a block diagram illustrating a configuration example of a computer system according to a first embodiment of this invention.

FIG. 1 is a block diagram illustrating a configuration example of a computer system according to a first embodiment of this invention.

The computer system according to this embodiment includes a management server 100, a client terminal 190, an NW-SW 110, a plurality of servers 120, a fiber channel (FC)-SW 140, and at least one storage apparatus 130.

The management server 100 is coupled via the NW-SW 100 to a management interface 141 of the FC-SW 140, management interfaces 121 of the plurality of servers 120, and a management interface 131 of the storage apparatus 130.

It should be noted that the management interfaces 121, 131, and 141 are each an I/O interface for transmitting information on each of pieces of IT equipment (hereinafter simply referred to as "equipment") in response to an inquiry issued from the management server 100, and, for example, a network interface to be described later can be used as each management interface.

The management server 100 is further coupled to the client terminal 190, which is used by an administrator to give an input/output instruction to the management server 100. This invention is not limited by a method of coupling between the management server 100 and the client terminal 190 and, for example, the management server 100 and the client terminal 190 may be coupled via a network or a physical cable. It should be noted that the administrator may directly operate the management server 100 without using the client terminal 190.

The NW-SW 110 is a switch, which is used to build a management network for managing, by the management server 100, the plurality of servers 120, the FC-SW 140, and the at least one storage apparatus 130. It should be noted that although one NW-SW 110 is used to build the management network in FIG. 1, a plurality of switches, a plurality of routers, and the like may be used to build the management network.

Further, the NW-SW 110 includes a network management part 111. The network management part 111 obtains information on a route coupling the server 120 and an LU 135 to each other. It should be noted that the network management part 111 is not used in the first embodiment. In a seventh embodiment of this invention, a description is given of specific processing of the network management part 111 with reference to FIG. 22.

The management server 100 executes various kinds of management on the overall computer system. For example, the management server 100 obtains various kinds of information from the respective servers 120 and the like, operates the powers of the respective servers 120, and also manages a cluster system. As used herein, the cluster system is a system including at least one cluster, and further, each cluster includes at least one server 120.

The management server 100 includes a control part 101 and a management table group 102. The control part 101 executes various kinds of processing in order to implement a management function of the management server 100. The management table group 102 stores information that is necessary for the control part 101 to execute the processing.

A hardware configuration and software configuration of the management server 100 are described later with reference to FIG. 2.

Figure 3:
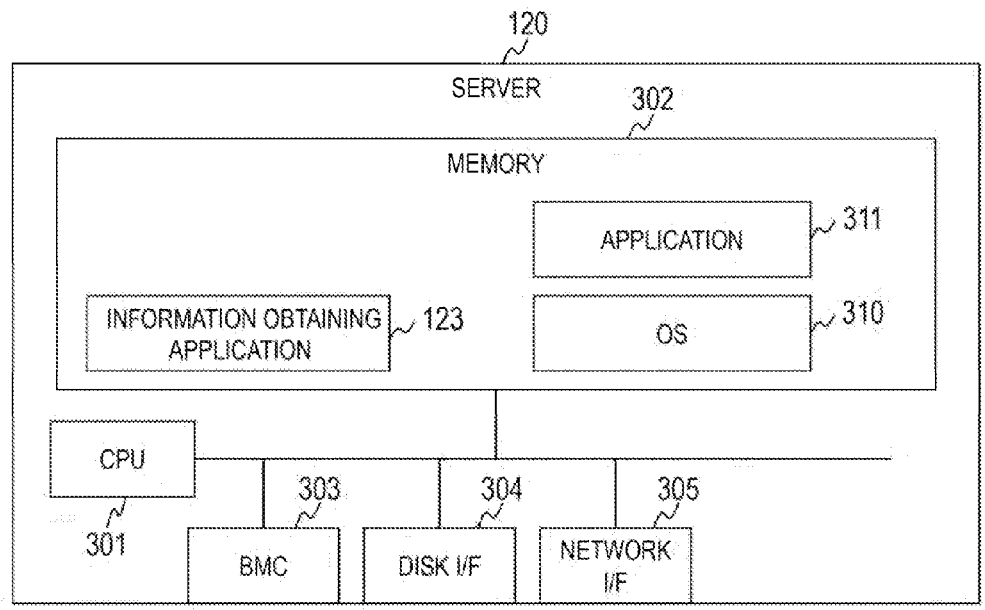
FIG. 3 is a block diagram illustrating a hardware configuration and software configuration of a server according to the first embodiment of this invention.

The servers 120 are each a computer on which an application 311, which is illustrated in FIG. 3, for executing a service runs.

In this embodiment, the plurality of servers 120 are used to build the cluster. Moreover, the servers 120 used to build the cluster include an active server 120 on which the application 311 illustrated in FIG. 3 runs and a standby server 120 for taking over the service in a case where a failure occurs on the active server 120. It should be noted that, in a normal state, the power of the standby server 120 is in an OFF state.

In this embodiment, all the servers 120 belong to any one of the clusters. It should be noted that there may be a server 120 that does not belong to any cluster.

Further, each of the servers 120 is coupled to a service network 105. The service network 105 is a network that is used by the application 311 illustrated in FIG. 3 running on each server 120. It should be noted that the service network 105 includes at least one switch, at least one router, and the like. The server 120 on which the application 311 illustrated in FIG. 3 runs is coupled via the service network 105 to a WAN or the like, and communicates to/from an external client computer.

Further, each of the servers 120 is coupled via the adapter 122 to the FC-SW 140 used to build a storage area network (SAN). The server 120 and the storage apparatus 130 are coupled to each other via the SAN in this embodiment, but this invention is not limited thereto. The server 120 and the storage apparatus 130 may be coupled to each other via an Internet Protocol (IP) network.

The adapter 122 includes an I/O adapter or I/O device such as a network interface card (NIC), a host bus adapter (HBA), and a converged network adapter (CNA) so as to be suitable for a type of the FC-SW 140.

In this embodiment, the server 120 includes an information obtaining application 123. The information obtaining application 123 obtains configuration information that is necessary for verifying running of a migration function. The configuration information at least includes information on the LU 135 accessed by the active server 120. Examples of the information on the LU 135 are conceivably an identifier, size, performance, and other such kinds of information of the LU 135, but this invention is not limited to the above-mentioned pieces of information.

It should be noted that the above-mentioned configuration information may include information on hardware of the server 120 and information on software of the server 120 thereof. The above-mentioned configuration information is hereinafter also referred to as "verification-use configuration information".

The FC-SW 140 is used to build the SAN, which couples the respective servers 120 and the storage apparatus 130 to each other. It should be noted that although one FC-SW 140 is used to build the SAN in FIG. 1, a plurality of the FC-SWs 140 may be used to build the SAN.

The storage apparatus 130 provides a storage area to be used by the server 120 on which the application 311 illustrated in FIG. 3 runs. The storage apparatus 130 includes a disk controller 132 and a plurality of storage devices (not shown).

The disk controller 132 manages the storage area, and also manages the coupling between the server 120 and the storage area and the like. The disk controller 132 includes a plurality of controllers 133 each including a plurality of ports 134.

In this embodiment, the LU 135 is generated from the storage area of the plurality of storage devices, and the generated LU 135 is provided to the active server 120. It should be noted that the LU 135 stores programs such as an OS 310 illustrated in FIG. 3 and an application 311 illustrated in FIG. 3, and various kinds of information that are necessary for executing those programs. In addition, the storage devices may conceivably be a hard disk drive (HDD), a solid state drive (SSD), or the like. Further, the storage apparatus 130 may build a RAID with the use of the plurality of storage devices.

It should be noted that each of the management server 100 and the server 120 may be of any type such as a physical server, a blade server, a virtualized server, and a logically or physically partitioned server. The effects of this invention can be obtained without limiting this invention by the types of the management server 100 and the server 120.

Figure 2:
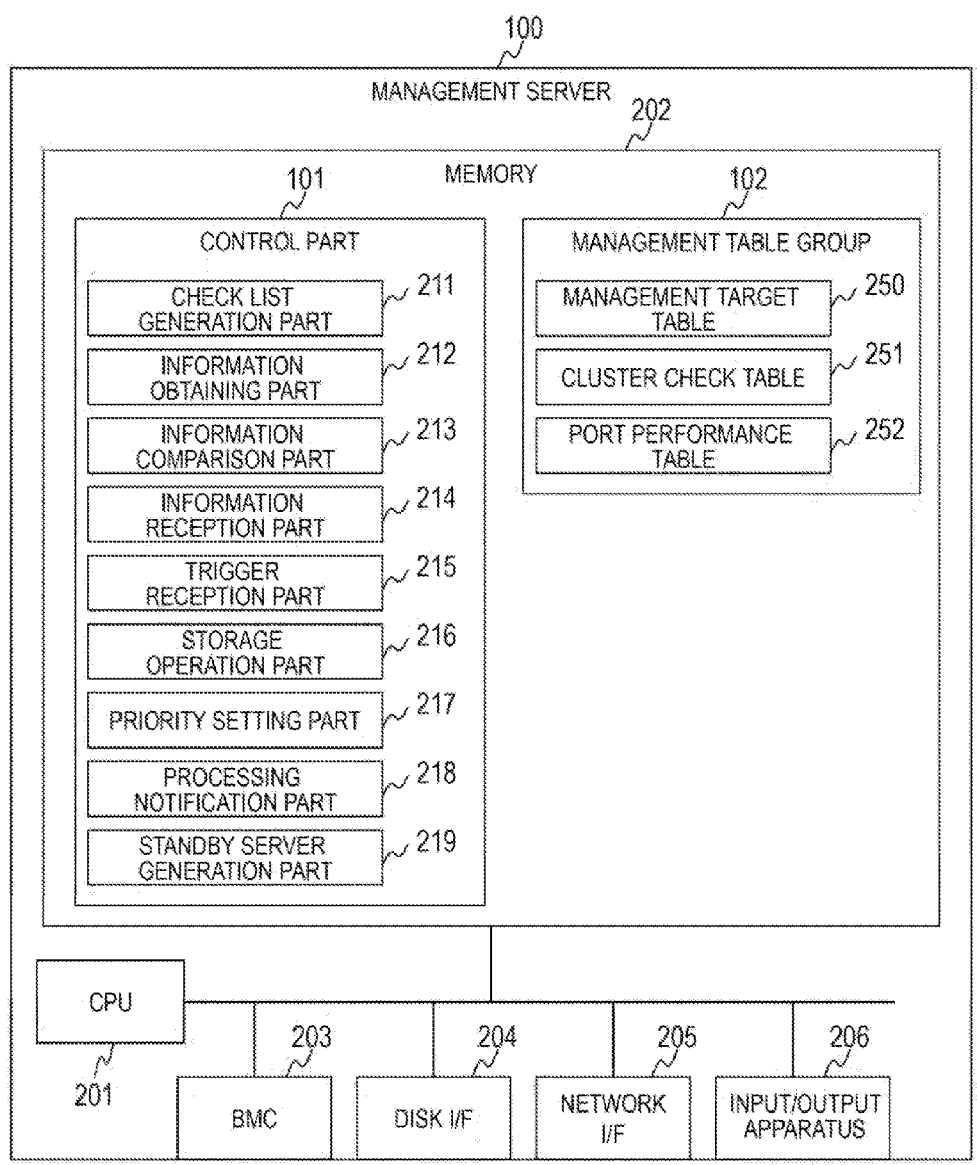
FIG. 2 is a block diagram illustrating a hardware configuration and software configuration of a management server according to the first embodiment of this invention.

FIG. 2 is a block diagram illustrating the hardware configuration and software configuration of the management server 100 according to the first embodiment of this invention.

The management server 100 includes a central processing unit (CPU) 201, a memory 202, a basement management controller (BMC) 203, a disk interface 204, a network interface 205, and an input/output apparatus 206.

The CPU 201 includes at least one arithmetic unit, and executes the programs stored in the memory 202. It is possible to implement functions of the management server 100 by the CPU 201 executing the programs. In the following, when a description is given with the use of a program as a subject, such description indicates that the program is executed by the CPU 201.

The memory 202 stores the programs executed by the CPU 201 and information that is necessary for executing the programs. The programs and information stored in the memory 202 are described later.

The BMC 203 controls the power, and also controls the respective interfaces. The disk interface 204 is an interface for accessing the storage apparatus 130. The network interface 205 is an interface for communicating to/from other apparatus via the IP network.

The input/output apparatus 206 includes an input apparatus such as a keyboard and a mouse and a display apparatus such as a display. The management server 100 may be connected to an external storage medium such as a USB memory via the input/output apparatus 206.

It should be noted that the management server 100 may not include the input/output apparatus 206 by itself. For example, the following methods are conceivable. Specifically, the management server 100 is coupled to the input/output apparatus 206 via an interface such as the network interface 205. Alternatively, the management server 100 is coupled to the client terminal 190 that includes the input/output apparatus 206.

In FIG. 2, one representative disk interface 204 and one representative network interface 205 are illustrated, but the management server 100 may include a plurality of the disk interfaces 204 and a plurality of the network interfaces 205.

For example, in a case where the management server 100 includes two network interfaces 205, the management server 100 may conceivably be coupled to the management network via one of the network interfaces 205, and may conceivably be coupled to the service network 105 via the other network interface 205.

Alternatively, in place of the disk interface 204 and the network interface 205, the management server 100 may include one I/O interface that can be coupled to an external apparatus such as the server 120 and the storage apparatus 130.

Next, a description is given of the programs and information stored in the memory 202.

The memory 202 stores the programs for implementing the control part 101 and the management table group 102. It should be noted that the memory 202 may include a program and information that are not shown.

The control part 101 includes a plurality of program modules, and executes processing for verifying running of a failover function. The processing for verifying running of the failover function is hereinafter also referred to as "cluster verification processing".

To be specific, the control part 101 includes a trigger reception part 215, an information obtaining part 212, a check list generation part 211, an information comparison part 213, an information reception part 214, a storage operation part 216, a priority setting part 217, a processing notification part 218, the network management part 111, and a standby server generation part 219.

The CPU 201 operates as function parts for implementing predetermined functions by operating in accordance with programs for implementing the respective function parts. For example, the CPU 201 operates in accordance with an information obtaining program, to thereby function as the information obtaining part 212. The same holds true for other programs. The CPU 201 also operates as a function part for implementing each of a plurality of pieces of processing executed by the respective programs. The computer and computer system are an apparatus and system that include those function parts.

The trigger reception part 215 detects a trigger for starting the cluster verification processing. Processing executed by the trigger reception part 215 is described later with reference to FIG. 9. The information obtaining part 212 obtains information from the server 120 as a processing target in the cluster verification processing. Processing executed by the information obtaining part 212 is described later with reference to FIG. 10.

The check list generation part 211 generates a cluster check table 251 to be used when the cluster verification processing is executed. Processing executed by the check list generation part 211 is described later with reference to FIG. 11. The information comparison part 213 determines whether or not the failover function runs normally. Processing executed by the information comparison part 213 is described later with reference to FIG. 12.

The information reception part 214 obtains various kinds of information necessary for the cluster verification processing. Processing executed by the information reception part 214 is described later with reference to FIGS. 13A, 13B, and 13C. The storage operation part 216 makes settings of the storage apparatus 130 when the cluster verification processing is executed. Processing executed by the storage operation part 216 is described later with reference to FIG. 14.

The priority setting part 217 sets, in a case where there are a plurality of the standby servers 120 in one cluster, a priority indicating a use order of each of the plurality of standby servers 120. Processing executed by the priority setting part 217 is described later with reference to FIG. 17. The processing notification part 218 notifies the administrator of a result of the cluster verification processing. Processing executed by the processing notification part 218 is described later with reference to FIG. 18.

The standby server generation part 219 gives an instruction to generate a virtual computer, in a case where the virtual computer is used as the standby server 120. It should be noted that the standby server generation part 219 is not used in the first embodiment. In a ninth embodiment of this invention, a description is given of specific processing of the standby server generation part 219 with reference to FIG. 27.

The management table group 102 includes a management target table 250, the cluster check table 251, and a port performance table 252.

The management target table 250 is generated and updated by the information obtaining part 212, and stores various kinds of information on the equipment such as the server 120 included in the computer system managed by the management server 100. Details of the management target table 250 are described later with reference to FIGS. 5A and 5B.

The cluster check table 251 is generated and updated by the check list generation part 211, and stores the result of the cluster verification processing. Details of the cluster check table 251 are described later with reference to FIGS. 6A and 6B.

The port performance table 252 stores information to be used when the priority is set. It should be noted that processing involving using the port performance table 252 is not executed in the first embodiment. In a sixth embodiment of this invention, a description is given of details of the port performance table 252 with reference to FIG. 20.

The information stored in the respective tables included in the management table group 102 may be automatically generated by other function parts of the management server 100, or may be input by the administrator manually or with the use of the client terminal 190.

The programs for implementing the control part 101 and the tables included in the management table group 102 can be stored in the storage apparatus 130, a storage device such as a non-volatile semiconductor memory, an HDD, or an SSD, or a computer-readable non-transitory storage medium such as an IC card, an SD card, or a DVD.

In this case, the CPU 201 reads the programs and tables from the storage apparatus 130, the storage device, or the computer-readable non-transitory storage medium, and loads the read programs and tables onto the memory 202.

FIG. 3 is a block diagram illustrating the hardware configuration and software configuration of the server 120 according to the first embodiment of this invention.

The server 120 includes a CPU 301, a memory 302, a BMC 303, a disk interface 304, and a network interface 305.

The CPU 301 includes at least one arithmetic unit, and executes programs stored in the memory 302. It is possible to implement functions of the server 120 by the CPU 301 executing the programs. In the following, when a description is given with the use of a program as a subject, such description indicates that the program is executed by the CPU 301.

The memory 302 stores the programs executed by the CPU 301 and information that is necessary for executing the programs. The programs and information stored in the memory 302 are described later.

The BMC 303 controls the power, and also controls the respective interfaces. The disk interface 304 is an interface for accessing the storage apparatus 130. The network interface 305 is an interface for communicating to/from other apparatus via the IP network.

The server 120 may include an input apparatus such as a keyboard and a mouse and a display apparatus such as a display.

Alternatively, in place of the disk interface 304 and the network interface 305, the server 120 may include one I/O interface that can be coupled to the external apparatus such as the management server 100 and the storage apparatus 130.

A description is given below of the programs and information stored in the memory 302. Illustrated in FIG. 3 are the programs that can be stored in both the active server 120 and the standby server 120. However, in this embodiment, contents of the memory 302 of the active server 120 differ from contents of the memory 302 of the standby server 120.

The memory 302 of the active server 120 stores programs for implementing the application 311 and the OS 310.

The OS 310 manages the overall server 120. The application 311 executes various kinds of services. It is assumed in this embodiment that the programs for implementing the OS 310 and the application 311 are stored in the LU 135.

On the other hand, no programs are stored in the memory 302 of the standby server 120 because its power is in an OFF state in the normal state. However, in this embodiment, in a case of receiving an activation instruction from the management server 100, the standby server 120 loads a program for implementing the information obtaining application 123 onto the memory 302.

The information obtaining application 123 obtains configuration information necessary for the cluster verification processing, in other words, the verification-use configuration information. Details of processing executed by the information obtaining application 123 are described later with reference to FIG. 16.

In this embodiment, the program for implementing the information obtaining application 123 is stored in advance in a non-volatile memory (not shown) of the server 120, and is loaded onto the memory 302 when the standby server 120 is activated.

A setting needs to be made on the server 120 so as to activate the information obtaining application 123 in this case. For example, the following method is conceivable. Specifically, a setting is made, by using a Basic Input/Output System (BIOS) or Unified Extensible Firmware Interface (UEFI), so that the information obtaining application 123 is activated after the activation of the standby server 120, when the activation instruction or an information obtaining instruction is received from the management server 100.

It is assumed in this embodiment that the server 120 is turned into the power OFF state again after the processing of the information obtaining application 123 is finished. It should be noted that the standby server 120 may activate the OS 310 and the like after the processing of the information obtaining application 123 is finished.

In FIG. 3, one representative disk interface 304 and one representative network interface 305 are illustrated, but the server 120 may include a plurality of the disk interfaces 304 and a plurality of the network interfaces 305.

In this embodiment, the server 120 includes the network interface 305 for coupling to each of the management network and the service network 105. The network interface 305 coupled to the management network corresponds to the management interface 121.

Figure 4:
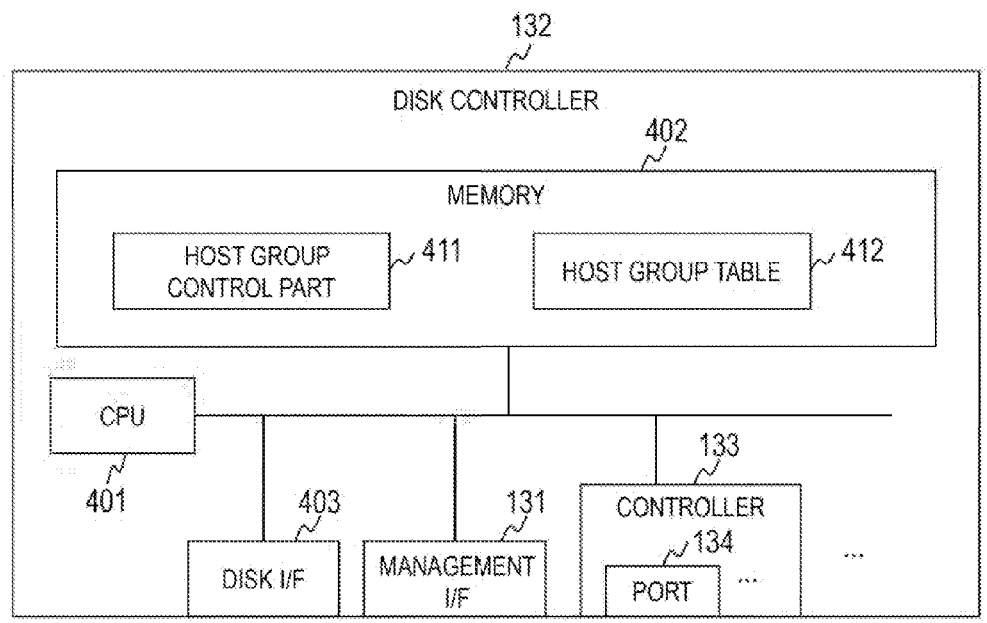
FIG. 4 is a block diagram illustrating a disk controller included in a storage apparatus according to the first embodiment of this invention.

FIG. 4 is a block diagram illustrating the disk controller 132 included in the storage apparatus 130 according to the first embodiment of this invention.

The disk controller 132 includes a CPU 401, a memory 402, a disk interface 403, the management interface 131 and the plurality of controllers 133.

The CPU 401 includes at least one arithmetic unit, and executes the programs stored in the memory 402. It is possible to implement functions of the storage apparatus 130 by the CPU 401 executing the programs. In the following, when a description is given with the use of a program as a subject, such description indicates that the program is executed by the CPU 401.

The memory 402 stores the programs executed by the CPU 401 and information that is necessary for executing the programs. The programs and information stored in the memory 402 are described later.

The disk interface 403 is an interface for accessing the LU 135 or storage devices of the storage apparatus 130. The management interface 131 is an interface for coupling to the management server 100 via the management network.

The controllers 133 each manages input/output processing to/from the equipment such as the server 120 which accesses to the storage apparatus 130. The controllers 133 each include the port 134 for coupling to the equipment.

In FIG. 4, one representative disk interface 403 and one representative controller 133 are illustrated, but the storage apparatus 130 may include a plurality of the disk interfaces 403 and a plurality of the controllers 133. Moreover, in FIG. 4, one representative port 134 is illustrated, but the controller 133 may include a plurality of the ports 134.

The memory 402 stores a program for implementing a host group control part 411, and a host group table 412.

The host group control part 411 manages settings of a host group. As used herein, the host group refers to a group to be used for mapping of the server 120 and the LU 135 and protecting security of data stored in the LU 135. The LU 135 that can be referred to or updated by the server 120 can be limited by setting the host group.

The CPU 401 loads the program for implementing the host group control part 411 onto the memory 402 and operates in accordance with the loaded program, to thereby function as the host group control part 411.

FIGS. 5A and 5B are explanatory diagrams illustrating an example of the management target table 250 according to the first embodiment of this invention.

The management target table 250 stores configuration information on the equipment as a management target, identification information of the cluster, and the like. In this embodiment, the server 120 corresponds to the equipment as the management target.

The management target table 250 includes a server ID 501, a management IP address 502, a model 503, configuration information 504, a WWN 505, LU information 506, running information 507, a cluster ID 508, and a type 509.

The server ID 501 stores an identifier for uniquely identifying the server 120 in the computer system managed by the management server 100. It should be noted that the data stored in the server ID 501 can be omitted by designating any one of the columns used in this table or a combination of a plurality of columns of the table. Further, the management server 100 may automatically assign, as their identifiers, the respective servers 120 with identification numbers in ascending order.

The management IP address 502 stores a management IP address assigned to the server 120. Based on the management IP address, the management server 100 is coupled to the server 120 as the management target equipment.

The model 503 stores information on the model of the server 120. The information stored in the model 503 is information on an infrastructure, and a maker, performance, limitation of a configurable system, and the like of the management target equipment can be understood based on this information. In this embodiment, as described later, it is determined whether or not the configuration of the server 120 as the management target is the same based on the model 503.

The configuration information 504 stores information on the configuration of the server 120. Examples of the information on the configuration include architecture of a processor, physical position information within the server 120 such as a chassis and a slot, and information indicating whether or not there is a characteristic function such as a multi-blade symmetric multi-processing (SMP) and a high availability (HA) configuration.

The WWN 505 stores a WWN to be used by the server 120 performing fibre channel communication to/from the LU 135. The WWN is a unique device identifier. It should be noted that, in a case where the server 120 and the storage apparatus are coupled to each other via an IP-SAN or the like, the WWN 505 stores an identifier that is equivalent to the WWN such as an iSCSI Qualified Name.

The LU information 506 stores information specifying the LU 135 by which is accessed by the server 120. In this embodiment, "Inquiry" information is stored in the LU information 506.

The running information 507 stores information indicating a running state of the server 120. The information indicating the running state is information indicating the power ON/OFF of the server 120 and indicating whether or not the OS or a service system (application 311) is running normally. The running information 507 may also store information indicating the fact that the communication between the management server 100 and the server 120 as the management target has been disconnected.

The cluster ID 508 stores an identifier for uniquely identifying the cluster to which the server 120 belongs. It should be noted that the data stored in the cluster ID 508 can be omitted by designating any one of the columns used in this table or a combination of a plurality of columns of the table. Further, the management server 100 may automatically assign, as their identifiers, the respective clusters with identification numbers in ascending order.

It should be noted that, in a case where the server 120 does not belong to any cluster, the cluster ID 508 is blank, or stores information indicating that the server 120 does not belong to any cluster.

The type 509 stores information indicating whether the server 120 is the active server 120 or the standby server 120 in the cluster to which the server 120 belongs.

It should be noted that, in a case where the server 120 does not belong to any cluster, the type 509 is blank, or stores information indicating that the server 120 does not belong to any cluster.

The pieces of information stored in the respective columns of the management target table 250 are hereinafter also collectively referred to as "configuration information" on the server 120.

FIGS. 6A and 6B are explanatory diagrams illustrating an example of the cluster check table 251 according to the first embodiment of this invention.

The cluster check table 251 stores, as the result of the cluster verification processing, a result of failover implementability determination for each check pair. As used herein, the check pair refers to a combination of the active server 120 and the standby server 120 belonging to the same cluster. Further, the failover implementability determination refers to processing of determining whether or not the failover is implementable between the active server 120 and the standby server 120.

To be specific, the cluster check table 251 includes a pair ID 601, a cluster ID 602, an active server ID 603, a standby server ID 604, a check flag 605, an LU flag 606, a verification result 607, a reason 608, obtained information 609, an obtaining time 610, and a priority 611.

The pair ID 601 stores an identifier for uniquely identifying the check pair. In this embodiment, one pair ID 601 is assigned to each combination of one active server 120 and one standby server 120.

The data stored in the pair ID 601 can be omitted by designating any one of the columns used in this table or a combination of a plurality of columns of the table. Further, the management server 100 may automatically assign, as their identifiers, the respective check pairs with identification numbers in ascending order.

The cluster ID 602 stores an identifier for uniquely identifying the cluster. The cluster ID 602 is the same as the cluster ID 508 of the management target table 250.

The active server ID 603 stores an identifier for uniquely identifying the active server 120. The active server ID 603 stores a server ID of the server 120 that is registered as the active server 120 among the servers 120 belonging to the cluster corresponding to the cluster ID 602. It should be noted that the active server ID 603 stores the same identifier as the identifier stored in the server ID 501.

The standby server ID 604 stores an identifier for uniquely identifying the standby server 120. The standby server ID 604 stores a server ID of the server 120 that is registered as the standby server 120 among the servers 120 belonging to the cluster corresponding to the cluster ID 602. It should be noted that the standby server ID 604 stores the same identifier as the identifier stored in the server ID 501.

The check flag 605 stores a flag indicating whether or not the failover implementability determination has been executed on the check pair. In this embodiment, in a case where the failover implementability determination has been executed, "Finished" is stored in the check flag 605, and in a case where the failover implementability determination has not been executed, the check flag 605 remains blank.

It should be noted that the above-mentioned information stored in the check flag 605 is merely an example, and this invention is not limited thereto.

The LU flag 606 stores information indicating whether or not the verification-use configuration information has been obtained by the information obtaining application 123 running on the standby server 120 corresponding to the standby server ID 604.

In this embodiment, in a case where the verification-use configuration information has been obtained, "Finished" is stored in the LU flag 606, and in a case where the verification-use configuration information has not been obtained, the LU flag 606 remains blank. It should be noted that the above-mentioned information stored in the LU flag 606 is merely an example, and this invention is not limited thereto.

The verification result 607 stores a result of the failover implementability determination. In this embodiment, the verification result 607 stores "Implementable", in a case where the failover is implementable between the server 120 corresponding to the active server ID 603 and the server 120 corresponding to the standby server ID 604. On the other hand, "Not Implementable" is stored in the verification result 607, in a case where the failover is not implementable.

It should be noted that the above-mentioned information stored in the verification result 607 is merely an example, and this invention is not limited thereto.

The reason 608 stores a reason why the failover is not implementable. For example, in a case where the standby server 120 cannot access the LU 135 assigned to the active server 120, the reason 608 stores "Not Accessible to LU" or the like. Based on the information indicated by the reason 608, the administrator can review the setting of the cluster and thereby review the setting of the failover and the like.

The obtained information 609 stores the verification-use configuration information obtained by the information obtaining application 123. In this embodiment, the obtained information 609 stores the "Inquiry" information for uniquely specifying the LU 135. It should be noted that the verification-use configuration information stored in the obtained information 609 is not limited to the "Inquiry" information, and may be any type of information as long as the information enables determination as to whether or not the standby server 120 can access the LU 135 assigned to the active server 120. The verification-use configuration information may also include a model of the server, I/O information, and other such information.

The obtaining time 610 stores a period of time required by the information obtaining application 123 to obtain the verification-use configuration information. For example, the obtaining time 610 stores a period of time from when a command for obtaining predetermined information is issued to when a response to the command is obtained.

The priority 611 stores a value indicating the use order of the standby server 120 to be used for the failover processing of the plurality of standby servers 120 belonging to the cluster. In this embodiment, the standby servers 120 are used for the failover processing in ascending order of the priority 611. It should be noted that the standby servers 120 may be selected preferentially in descending order of the priority 611.

Figure 7:
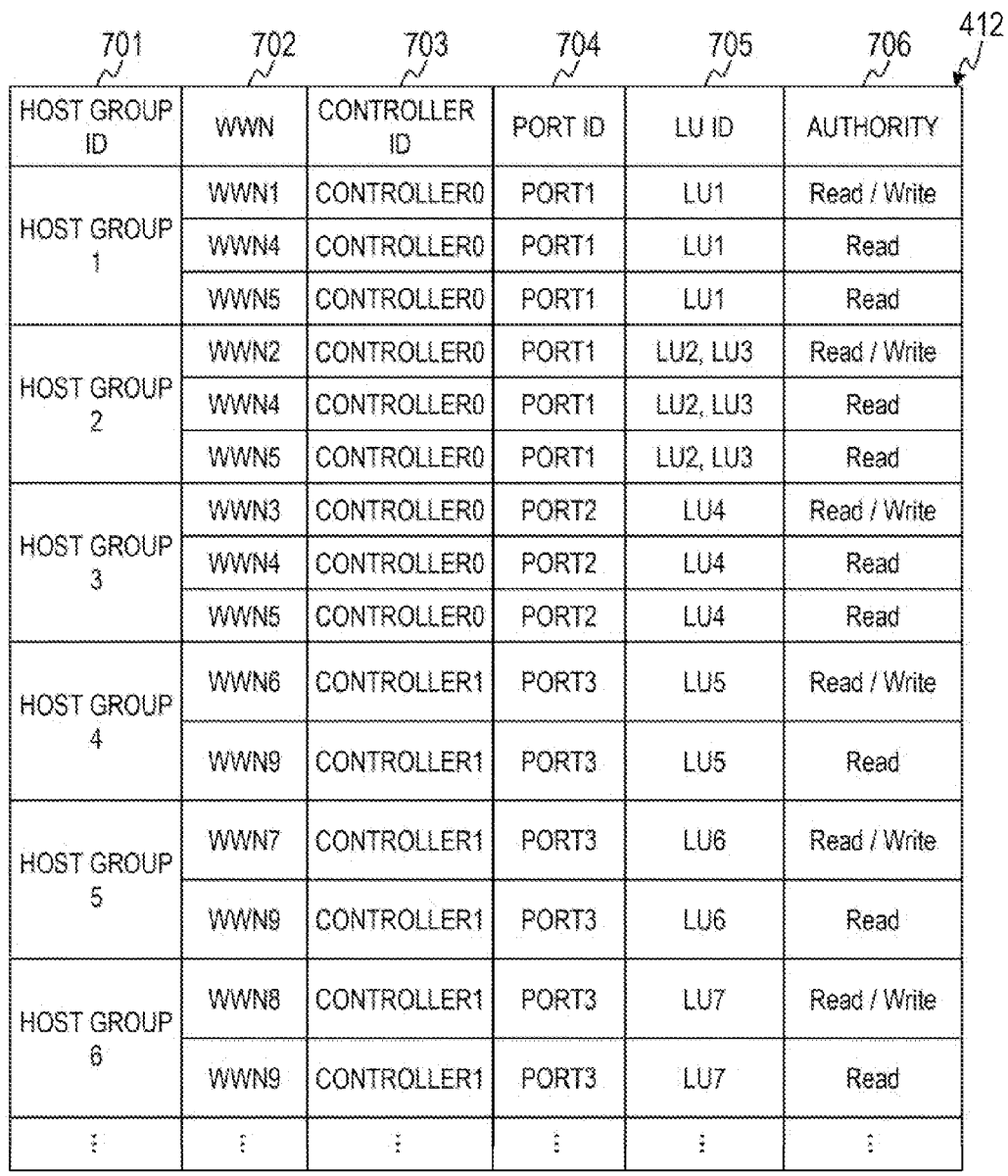
FIG. 7 is an explanatory diagram illustrating an example of a host group table according to the first embodiment of this invention.

FIG. 7 is an explanatory diagram illustrating an example of the host group table 412 according to the first embodiment of this invention.

The host group table 412 stores information on the controller 133 and the port 134 through which the server 120 accesses the LU 135 of the storage apparatus 130, and information on the accessible LU 135. To be specific, the host group table 412 includes a host group ID 701, a WWN 702, a controller ID 703, a port ID 704, an LU ID 705, and an authority 706.

The host group ID 701 stores an identifier for uniquely identifying the host group. The host group is a group of WWNs of the servers 120 for which a reference and/or update to the LU 135 assigned thereto are/is allowed.

The data stored in the host group ID 701 can be omitted by designating any one of the columns used in this table or a combination of a plurality of columns of the table. Further, the management server 100 may automatically assign, as their identifiers, the respective host groups with identification numbers in ascending order.

The WWN 702 stores a WWN of the server 120 accessing to the storage apparatus 130. The server 120 that includes the adapter 122 corresponding to the WWN stored in the WWN 702 can access the LU 135 of the host group.

The controller ID 703 stores an identifier of the controller 133 to be used when the server 120 accesses the storage apparatus 130.

The port ID 704 stores an identifier of the port 134 to be used when the server 120 accesses the storage apparatus 130.

The LU ID 705 stores an identifier of the LU 135 registered in the host group.

The authority 706 stores information on an authority assigned to the server 120 that includes the adapter 122 corresponding to the WWN 702 with respect to the LU 135 corresponding to the LU ID 705.

In this embodiment, "Read/Write" is stored in the authority 706 in a case where an authority to refer to the LU 135 and an authority to write into the LU 135 are assigned, and "Read" is stored in the authority 706 in a case where the authority to refer to the LU 135 is assigned. It should be noted that the above-mentioned information stored in the authority 706 is merely an example, and this invention is not limited thereto.

It should be noted that, in a case where the WWN of the standby server 120 to which the authority to refer to the LU 135 is assigned is added to the host group table 412, the standby server 120 in question cannot perform write processing even when the standby server 120 accesses the LU 135, and hence the standby server 120 in question does not affect the active server 120.

In the following, a description is given of specific processing of the respective constituent parts according to the first embodiment of this invention. First, a description is given of a flow of the cluster verification processing with reference to a sequence diagram.

Figure 8:
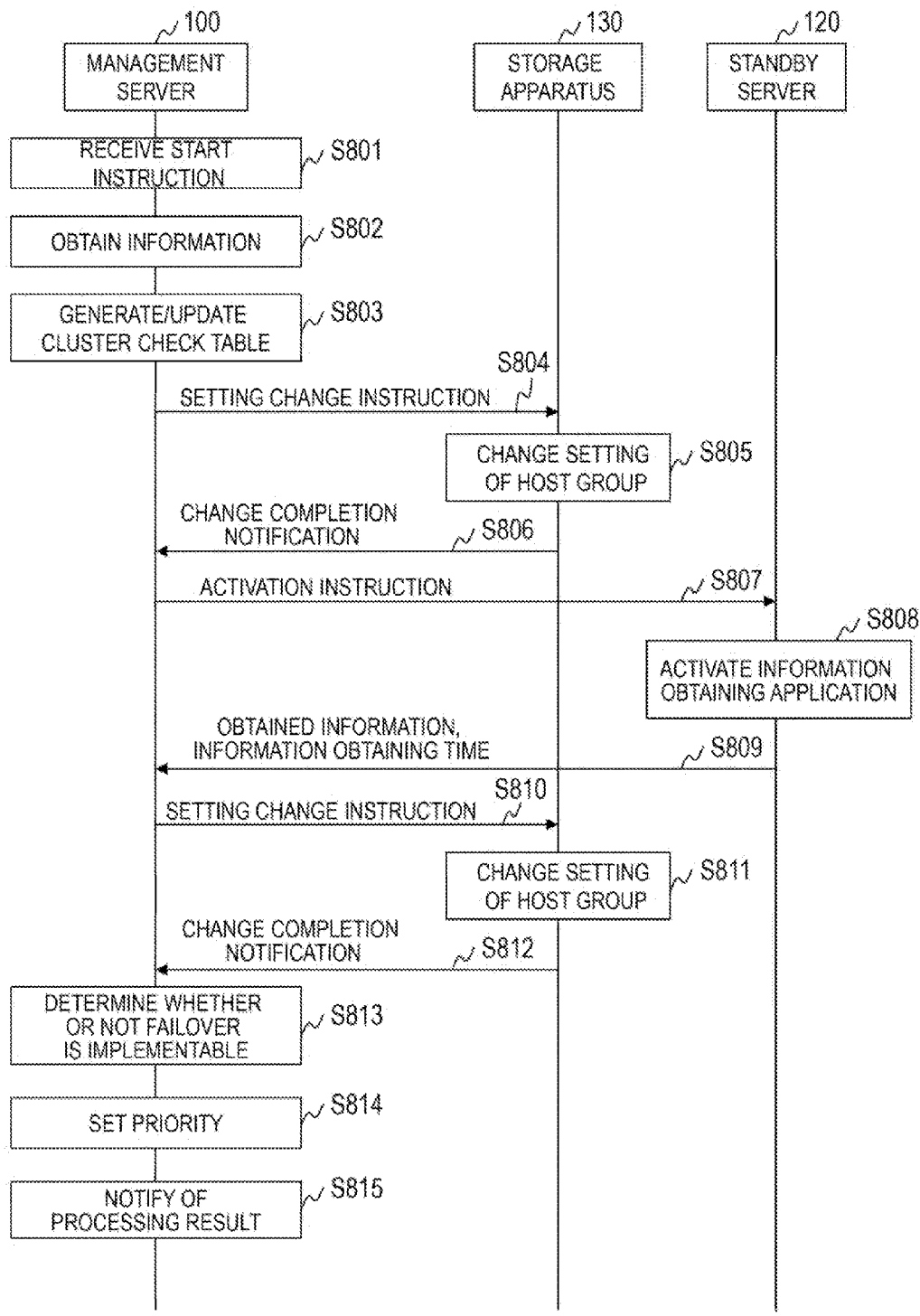
FIG. 8 is a sequence diagram illustrating the flow of cluster verification processing according to the first embodiment of this invention.

FIG. 8 is a sequence diagram illustrating the flow of the cluster verification processing according to the first embodiment of this invention.

In a case of receiving an instruction to start the cluster verification processing from the administrator, the management server 100 starts the cluster verification processing (Step S801). To be specific, the trigger reception part 215 instructs the information obtaining part 212 to start the processing, in a case of receiving the instruction to start the cluster verification processing.

The management server 100 obtains from the computer system the configuration information on the server 120 as the management target (Step S802). To be specific, the information obtaining part 212 obtains from a predetermined server 120 the configuration information on the predetermined server 120.

The management server 100 generates and/or updates the cluster check table 251 (Step S803). To be specific, the check list generation part 211 combines the active server 120 with the standby server 120 to generate the check pair, and adds an entry corresponding to the generated check pair to the cluster check table 251.

The management server 100 instructs the storage apparatus 130 to change the setting of the host group (Step S804). To be specific, the storage operation part 216 transmits to the host group control part 411 an instruction to change the setting of the host group. The storage operation part 216 at this time instructs the host group control part 411 to add the WWN of the standby server 120 with the reference authority assigned thereto to the host group to which the active server 120 belongs.

In a case of receiving the instruction from the management server 100, the storage apparatus 130 changes the setting of the host group based on the received instruction (Step S805). To be specific, the host group control part 411 adds the WWN of the standby server 120 with the reference authority assigned thereto to the host group to which the active server 120 belongs.

The storage apparatus 130 notifies the management server 100 that the setting of the host group has been changed (Step S806). To be specific, the host group control part 411 notifies the storage operation part 216 that the setting of the host group has been changed.

The management server 100 transmits to the standby server 120 the instruction to activate the information obtaining application 123 (Step S807). To be specific, the information reception part 214 transmits to the standby server 120 the instruction to activate the information obtaining application 123.

In a case of receiving the instruction to activate the information obtaining application 123, the standby server 120 activates the information obtaining application 123 to obtain the verification-use configuration information (Step S808).

The standby server 120 transmits to the management server 100 the verification-use configuration information, which has been obtained by executing the information obtaining application 123 (Step S809). To be specific, the information obtaining application 123 transmits the verification-use configuration information to the information reception part 214. It should be noted that, in this embodiment, the verification-use configuration information at least includes information on the LU 135 and an information obtaining time.

The management server 100 instructs the storage apparatus 130 to return the setting of the host group to the original one (Step S810). To be specific, the information reception part 214 transmits a setting change instruction to return the changed setting of the host group to the original one. Specifically, the management server 100 instructs the storage apparatus 130 to delete the WWN added to the host group in Step S805.

In a case of receiving the instruction to change the setting of the host group, the storage apparatus 130 changes the setting of the host group (Step S811). To be specific, the host group control part 411 deletes the WWN of the standby server 120 from the host group to which the active server 120 belongs.

The storage apparatus 130 notifies the management server 100 that the setting of the host group has been changed (Step S812). To be specific, the host group control part 411 notifies the information reception part 214 that the setting of the host group has been changed.

The management server 100 determines, for each check pair, whether or not the failover is implementable (Step S813). To be specific, the information comparison part 213 compares the information on the LU 135 of the active server 120 and the information on the LU 135 obtained from the standby server 120 to determine whether or not the failover is implementable.

The management server 100 sets the priority, which is the use order of the standby server 120 in the failover processing (Step S814). To be specific, the priority setting part 217 executes priority setting processing based on the cluster check table 251 and a result of the determination processing.

The management server 100 notifies the administrator of a processing result of the cluster verification processing (Step S815), and brings the processing to an end. To be specific, the processing notification part 218 generates information for notifying the administrator of the processing result, and presents the generated information to the administrator.

Through the processing described above, it is possible to determine whether or not the failover is implementable without actually executing the failover processing.

It should be noted that the processing of Steps S813 and S814 may be executed at any timing from Step S809 to Step S812 as long as the consistency of the processing can be maintained. For example, after obtaining the verification-use configuration information in Step S809, the management server 100 may determine whether or not the failover is implementable.

It should be noted that the processing from Steps S804 to S812 can be omitted in a case where the verification-use configuration information has been obtained.

Figure 9:
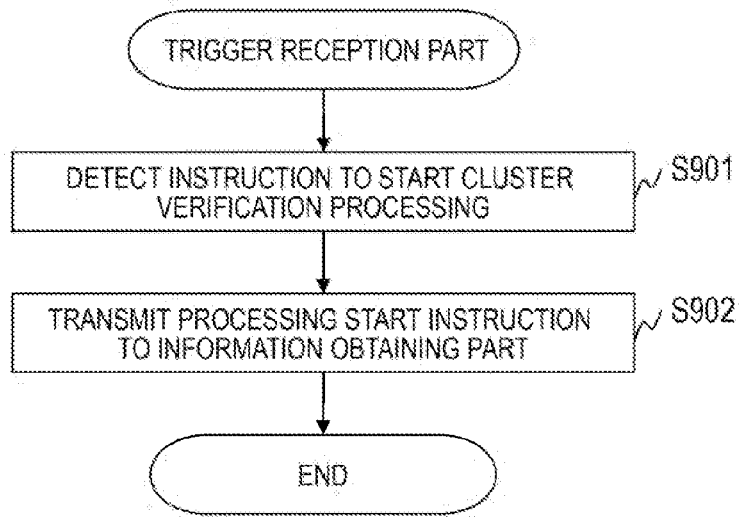
FIG. 9 is a flow chart illustrating an example of processing executed by a trigger reception part of the management server according to the first embodiment of this invention.

FIG. 9 is a flow chart illustrating an example of processing executed by the trigger reception part 215 of the management server 100 according to the first embodiment of this invention.

The trigger reception part 215 detects the instruction to start the cluster verification processing input from the administrator (Step S901).

It should be noted that the trigger for starting the cluster verification processing is not limited to the time when the start instruction input from the administrator is detected. For example, the processing may be started when a predetermined period of time has elapsed based on a schedule function of the management server 100. Alternatively, the processing may be started periodically. Still alternatively, the processing may be started when a change of the configuration of the server 120 belonging to the cluster is detected.

It should be noted that the instruction to start the cluster verification processing includes information for specifying a target of the cluster verification processing designated by the administrator. The information for specifying the target of the cluster verification processing may be any type of information as long as the information enables specification of the processing target such as the identifier of the server 120 or the identifier of the cluster.

The target of the cluster verification processing is hereinafter also referred to as "processing target". In addition, the information for specifying the processing target is hereinafter also referred to as "processing target identification information".

The trigger reception part 215 transmits the instruction to start the processing to the information obtaining part 212 (Step S902), and brings the processing to an end. The instruction to start the processing includes the processing target identification information.

It should be noted that, in the cluster verification processing, the processing is executed on a cluster-by-cluster basis. Specifically, in a case where the identifier of the server 120 is included as the processing target identification information, the cluster to which the server 120 in question belongs is a unit of the processing (processing unit). In addition, in a case where the identifier of the cluster is included as the processing target identification information, the cluster in question is the processing unit. However, this invention is not limited thereto, and the cluster verification processing may be executed on a plurality of clusters.

Figure 10:
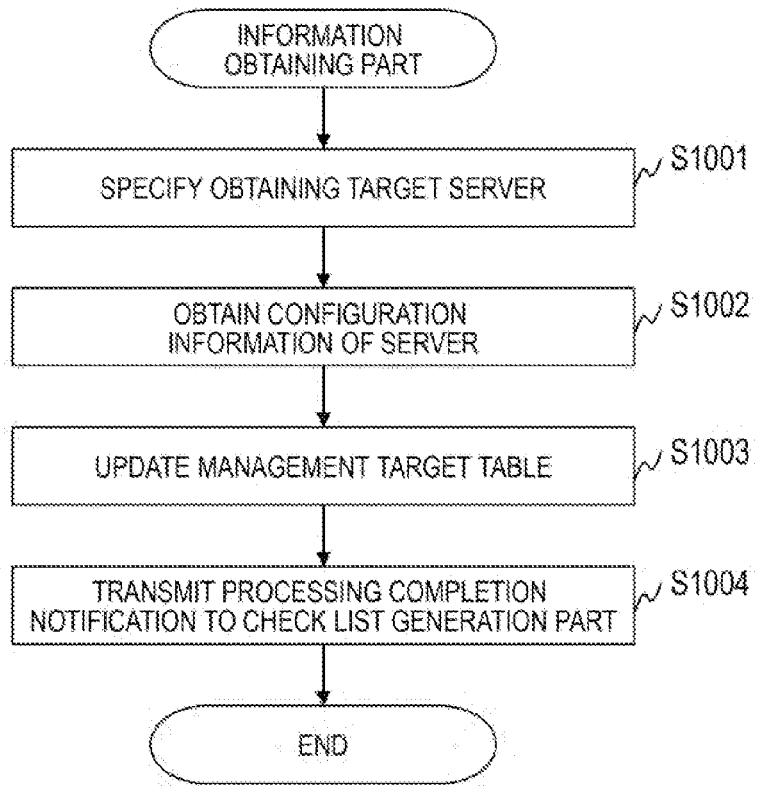
FIG. 10 is a flow chart illustrating an example of processing executed by an information obtaining part of the management server according to the first embodiment of this invention.

FIG. 10 is a flow chart illustrating an example of processing executed by the information obtaining part 212 of the management server 100 according to the first embodiment of this invention.

The information obtaining part 212 refers to the management target table 250 based on the processing target identification information notified from the trigger reception part 215 to specify the server 120 to be a target of the failover implementability determination processing (Step S1001). The server 120 to be a target of the failover implementability determination processing is hereinafter also referred to as "determination target server 120". The following processing is executed in Step S1001.

In a case where the identifier of the active server 120 is received as the processing target identification information, the information obtaining part 212 refers to the management target table 250 to search for the active server 120 corresponding to the identifier in question and the standby server 120 included in the cluster to which the active server 120 belongs. In this case, the retrieved active server 120 and standby server 120 are the determination target servers 120. The same holds true for a case where the identifier of the standby server 120 is notified.

Further, in a case where the identifier of the cluster is received as the processing target identification information, the information obtaining part 212 refers to the management target table 250 to search for all servers 120 belonging to the cluster corresponding to the identifier in question. In this case, all the retrieved servers 120 are the determination target server 120.

It should be noted that the cluster as the processing unit can be specified through the processing of Step S1001. The information obtaining part 212 may temporarily store the identifier of the cluster as the processing unit in a work area of the memory 202.

The information obtaining part 212 obtains the configuration information of the server 120 from each of the specified determination target servers 120 (Step S1002).

To be specific, the information obtaining part 212 executes configuration information obtaining processing on each of the specified determination target servers 120. A known technology may be used in order to execute the configuration information obtaining processing, and a detailed description thereof is therefore omitted.

The configuration information on the server 120 as the processing target such as the model of the server 120 and the "Inquiry" information for specifying the LU 135 assigned to the server 120 is obtained by executing the configuration information obtaining processing. It should be noted that, in a case where the determination target server 120 is the standby server 120, the standby server 120 in question cannot access the LU 135, and hence the "Inquiry" information is not obtained.

The information obtaining part 212 updates the management target table 250 based on the obtained configuration information on the server 120 (Step S1003). To be specific, the following processing is executed.

In a case where there is no entry for the determination target server 120 in the management target table 250, the information obtaining part 212 adds a new entry to the management target table 250 and registers the obtained configuration information on the server 120 in the added entry. In a case where there is an entry for the determination target server 120 in the management target table 250, the information obtaining part 212 overwrites the obtained configuration information on the server 120 into the entry.

The information obtaining part 212 transmits a processing completion notification to the check list generation part 211 (Step S1004), and brings the processing to an end.

Figure 11:
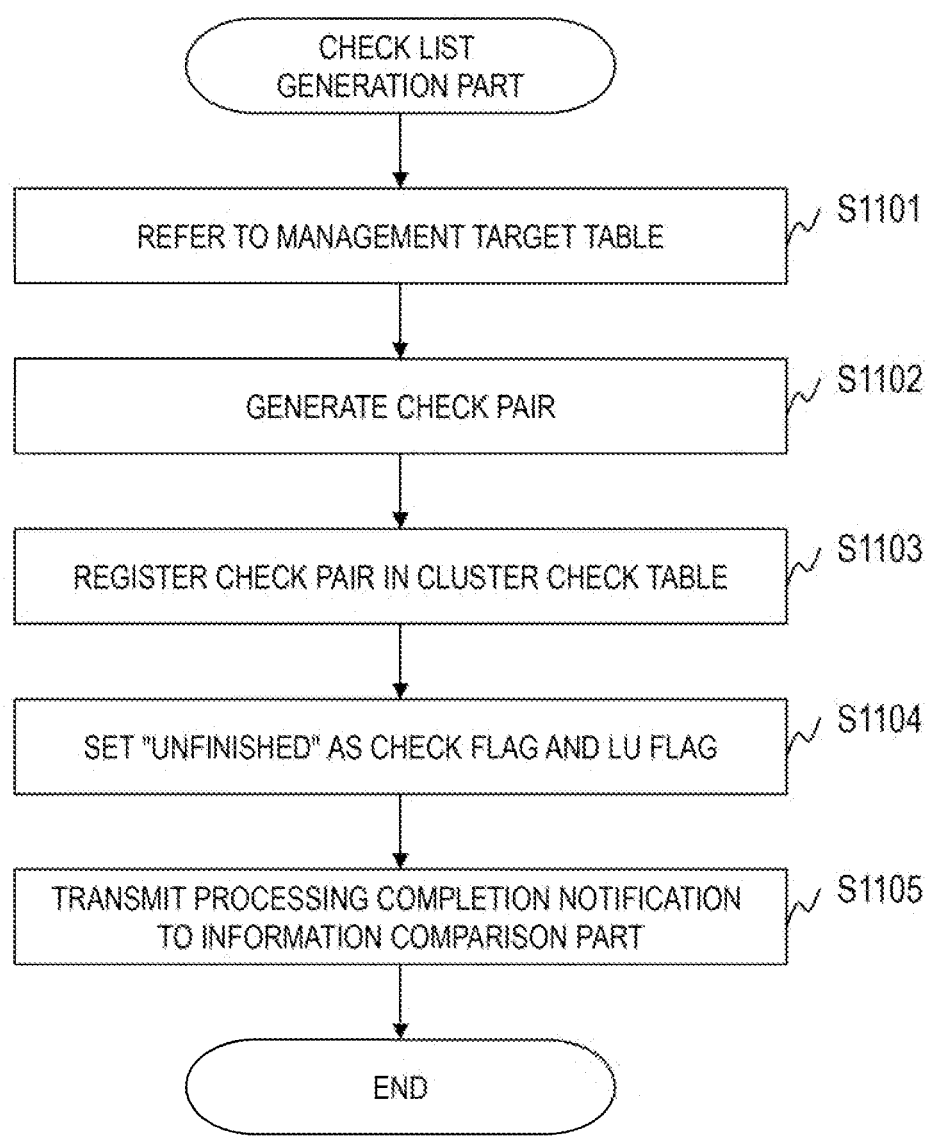
FIG. 11 is a flow chart illustrating an example of processing executed by a check list generation part of the management server according to the first embodiment of this invention.

FIG. 11 is a flow chart illustrating an example of processing executed by the check list generation part 211 of the management server 100 according to the first embodiment of this invention.

The check list generation part 211 starts the processing, in a case of receiving the processing completion notification from the information obtaining part 212.

The check list generation part 211 refers to the management target table 250 (Step S1101) to generate the check pair (Step S1102). The processing is here branched as follows depending on the processing target identification information.

In a case where the identifier of the active server 120 is received as the processing target identification information, the check list generation part 211 generates a combination with the standby server 120 included in the cluster to which the active server 120 in question belongs. One combination corresponds to one check pair in this case.

For example, in the cluster check table 251 illustrated in FIGS. 6A and 6B, in a case where "Server 1" is received as the processing target identification information, the following check pair is generated. The check list generation part 211 specifies "Server 4" and "Server 5" as the standby servers 120 belonging to the cluster having the cluster ID 602 of "Cluster 1". Moreover, the check list generation part 211 generates the check pair of "Server 1" and "Server 4" and the check pair of "Server 1" and "Server 5".

Also in a case where the identifier of the standby server 120 is received as the processing target identification information, the processing similar to the one described above is executed. Specifically, the check list generation part 211 generates the combination with the active server 120 within the cluster to which the standby server 120 belongs.

In a case where the identifier of the cluster is received as the processing target identification information, the check list generation part 211 generates a predetermined number of combinations of the active server 120 and the standby server 120 belonging to the designated cluster.

The number of check pairs to be generated and a condition for the check pairs to be generated can be set arbitrarily here. For example, all combinations of the active server 120 and the standby server 120 may be generated as the check pairs. In this case, the number of check pairs to be generated is a number obtained by multiplying the number of the active servers by the number of the standby servers. Alternatively, for the each active server 120, the combination of each active server 120 with one standby server 120 may be generated as the check pair. In this case, the number of check pairs to be generated is the number of the active servers 120.

The processing of Step S1102 is as described above.

Next, the check list generation part 211 registers information on the generated check pair in the cluster check table 251 (Step S1103). To be specific, the following processing is executed.

The check list generation part 211 generates, in the cluster check table 251, a new entry for each check pair. The check list generation part 211 stores a predetermined identifier in the pair ID 601 of the generated entry. It is assumed here that the identifiers are stored in ascending order.

Next, the check list generation part 211 stores necessary information in the newly-generated entry. To be specific, the identifier is stored in each of the cluster ID 602, the active server ID 603, and the standby server ID 604. At this time, other columns store no values.

It should be noted that, in a case where there is already an entry corresponding to the check pair, the check list generation part 211 does not need to register the information on the generated check pair in the cluster check table 251.

The processing of Step S1103 is as described above.

Next, the check list generation part 211 sets "Unfinished" as each of the check flag 605 and the LU flag 606 of the newly-added entry (Step S1104).

The check list generation part 211 transmits the processing completion notification to the information comparison part 213 (Step S1105), and brings the processing to an end.

It should be noted that, at the time when a given cluster is built, the check list generation part 211 may register, as the check pairs, all combinations of the active servers 120 and the standby servers 120 belonging to the given cluster, and update the information on the check pairs as necessary.

Further, when executing the failover implementability determination processing to be described later, the management server 100 may verify whether or not there is a check pair in the cluster check table 251, and in a case where there is no check pair, the check list generation part 211 may newly add a check pair.

Figure 12:
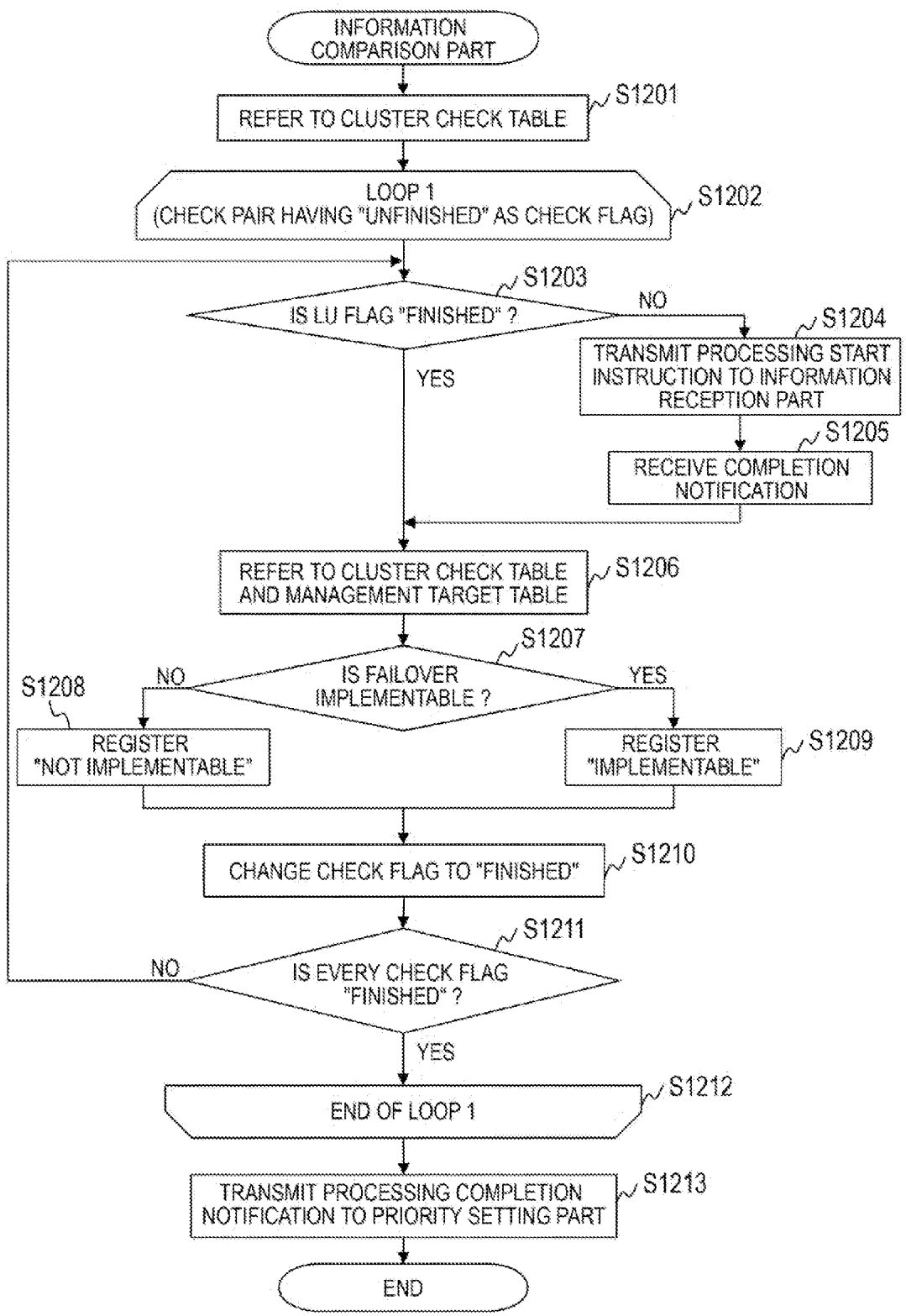
FIG. 12 is a flow chart illustrating an example of processing executed by an information comparison part of the management server according to the first embodiment of this invention.

FIG. 12 is a flow chart illustrating an example of processing executed by the information comparison part 213 of the management server 100 according to the first embodiment of this invention.

The information comparison part 213 refers to the cluster check table 251 (Step S1201) to select one entry having "Unfinished" as the check flag 605 (Step S1202). Processing from Step S1202 to Step S1212 is loop processing on the check flags 605, and is executed until "Finished" is stored in the check flag 605 of every entry.

The information comparison part 213 determines whether or not the LU flag 606 of the selected entry is "Finished" (Step S1203). In other words, it is determined whether or not the verification-use configuration information has been obtained. The LU flag 606 being "Finished" indicates that the verification-use configuration information has been obtained.

In a case where it is determined that the LU flag 606 of the selected entry is "Finished", the information comparison part 213 proceeds to Step S1206.

In a case where it is determined that the LU flag 606 of the selected entry is not "Finished", the information comparison part 213 transmits to the information reception part 214 a processing start instruction including the cluster ID 602 of the selected entry (Step S1204). After that, the information comparison part 213 waits until receiving the processing completion notification from the information reception part 214.

After receiving the processing completion notification from the information reception part 214 (Step S1205), the information comparison part 213 proceeds to Step 1206.

The information comparison part 213 refers to the cluster check table 251 and the management target table 250 (Step S1206) to determine whether or not the failover is implementable (Step S1207). In other words, the failover implementability determination processing is executed. To be specific, the following processing is executed.

The information comparison part 213 refers to the cluster check table 251 to obtain the active server ID 603 and standby server ID 604 of the selected entry.

The information comparison part 213 refers to the management target table 250 to search for the entry whose server ID 501 matches the obtained active server ID 603 and the entry whose server ID 501 matches the obtained standby server ID 604.

Next, the failover implementability determination processing including the following two pieces of comparison processing is executed.

(Comparison 1) The information comparison part 213 compares the model 503 and configuration information 504 of the entry of the active server 120 in the management target table 250 with the model 503 and configuration information 504 of the entry of the standby server 120 in the management target table 250.

(Comparison 2) The information comparison part 213 compares the LU information 506 of the entry of the active server in the management target table 250 with the obtained information 609 of the selected entry in the cluster check table 251.

In the comparison processing of (Comparison 1), it is determined whether or not the model and the like of the server 120 of the active server 120 match those of the standby server 120. In addition, in the comparison processing of (Comparison 2), it is determined whether or not the LU 135 accessed by the active server 120 matches the LU 135 accessible by the standby server 120.

The comparison processing of (Comparison 2) is, more specifically, processing executed in order to determine whether or not the standby server 120 can take over the service being executed by the active server 120. In other words, in a case where the standby server 120 can access the entire LU 135 used by the active server 120, the standby server 120 can take over the service even after the failover processing. On the other hand, in a case where the standby server 120 cannot access the LU 135 used by the active server 120 or in a case where the standby server 120 cannot access a part of the LU 135, the standby server 120 may affect the service after the failover processing.

It is therefore determined in the comparison processing of (Comparison 2) whether the LU 135 accessed by the active server 120 matches the LU 135 obtained by the standby server 120.

In this embodiment, it is determined in the comparison processing of (Comparison 2) that the LU 135 accessed by the active server 120 matches the LU 135 accessible by the standby server 120, in a case where the LU information 506 completely matches the obtained information 609. It should be noted that this invention is not limited to the above-mentioned criterion for determination.

For example, the standby server 120 can take over the service, in a case where information on the LU 135 storing the OS 310 of the standby server 120 matches that of the active server 120 or in a case where information on the LU 135 storing the application 312 of the standby server 120 matches that of the active server 120, and hence also in that case, it may be determined that the LU 135 accessed by the active server 120 matches the LU 135 accessible by the standby server 120.

It should be noted that, in a case where the verification-use configuration information including the configuration of the LU 135, the model of the standby server 120, and the like is obtained by the information obtaining application 123, it is only necessary that the model 503 and configuration information 504 of the entry of the active server 120 in the management target table 250 be compared with the obtained information 609 of the selected entry in the cluster check table 251. In this manner, it is possible to implement processing equivalent to the one implemented when both pieces of comparison processing of (Comparison 1) and (Comparison 2) are executed.

It should be noted that, in Step S1207, in addition to the above-mentioned comparison processing, the information comparison part 213 can determine whether or not the active server 120 or the standby server 120 has a server model that is not compatible with the failover function, or determine whether or not the failover processing cannot be executed because the standby server 120 is currently running.

In a case where it is determined that the failover is not implementable, the information comparison part 213 stores "Not Implementable" in the verification result 607 of the selected entry, and stores the reason why the failover is not implementable in the reason 608 (Step S1208), and proceeds to Step S1210.

For example, in a case where it is determined as a result of the comparison processing of (Comparison 2) that the information on the LU 135 of the active server 120 does not match that of the standby server 120, the information comparison part 213 determines that the standby server 120 cannot access the LU 135 assigned to the active server 120, and stores "Not Accessible to LU" in the column 608.

In a case where it is determined that the failover is implementable, the information comparison part 213 stores "Implementable" in the verification result 607 of the selected entry (Step S1209), and proceeds to Step S1210.

The information comparison part 213 stores "Finished" in the check flag 605 of the selected entry (Step S121.0).

The information comparison part 213 determines whether or not the check flag 605 is "Finished" in every entry of the cluster check table 251 (Step S1211).

In a case where it is determined that the check flag 605 is not "Finished" in every entry of the cluster check table 251, the information comparison part 213 returns to Step S1203, selects another entry whose check flag 605 is "Unfinished", and executes similar processing.

In a case where it is determined that the check flag 605 is "Finished" in every entry of the cluster check table 251, the information comparison part 213 brings the loop processing to an end (Step S1212), transmits the processing completion notification to the priority setting part 217 (Step S1213), and brings the processing to an end. The processing completion notification in question includes the identifier of the cluster that is the processing unit.

Figure 13A:
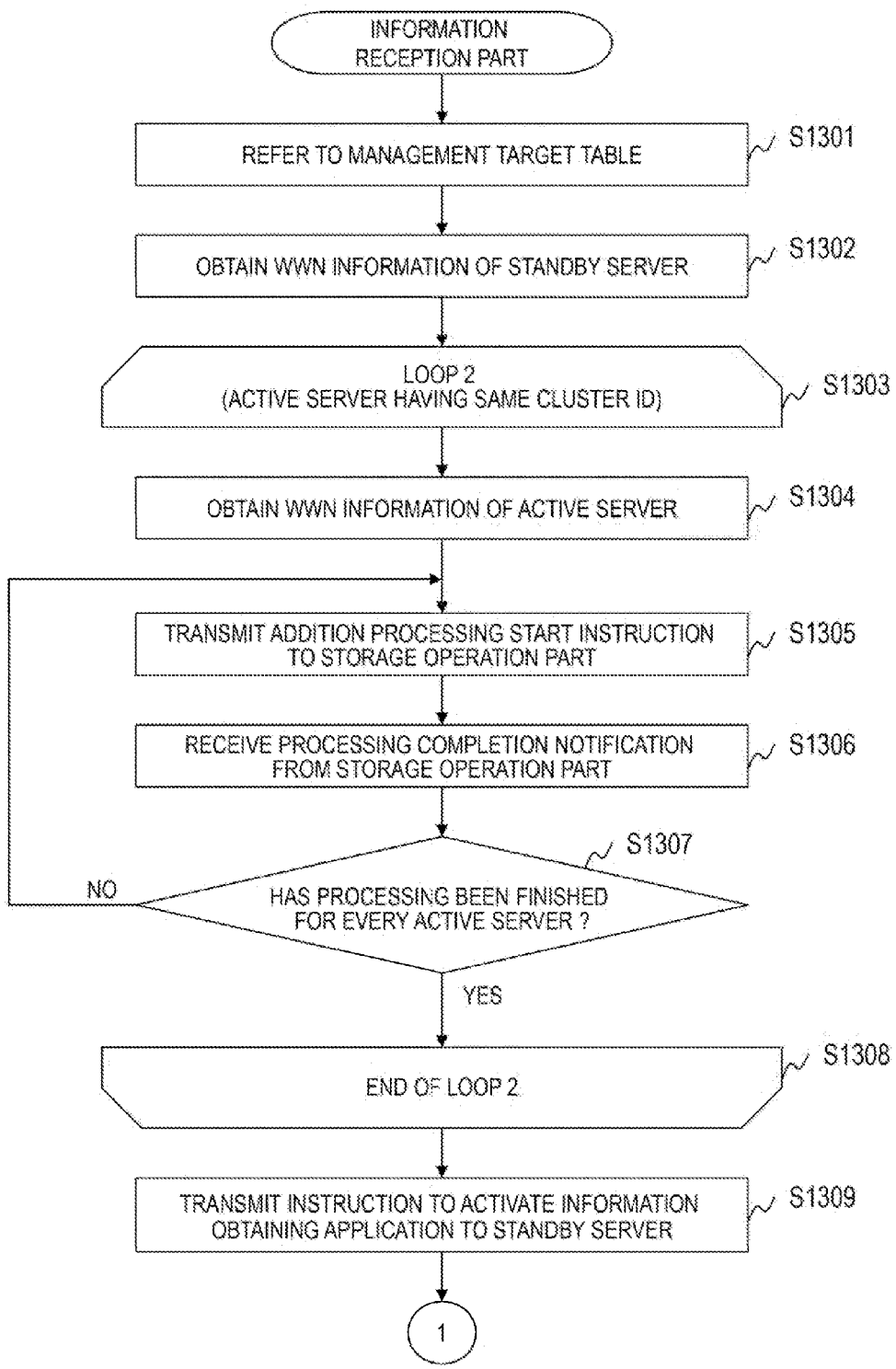
FIGS. 13A, 13B, and 13C are flow charts illustrating an example of processing executed by an information reception part of the management server according to the first embodiment of this invention.
Figure 13B:
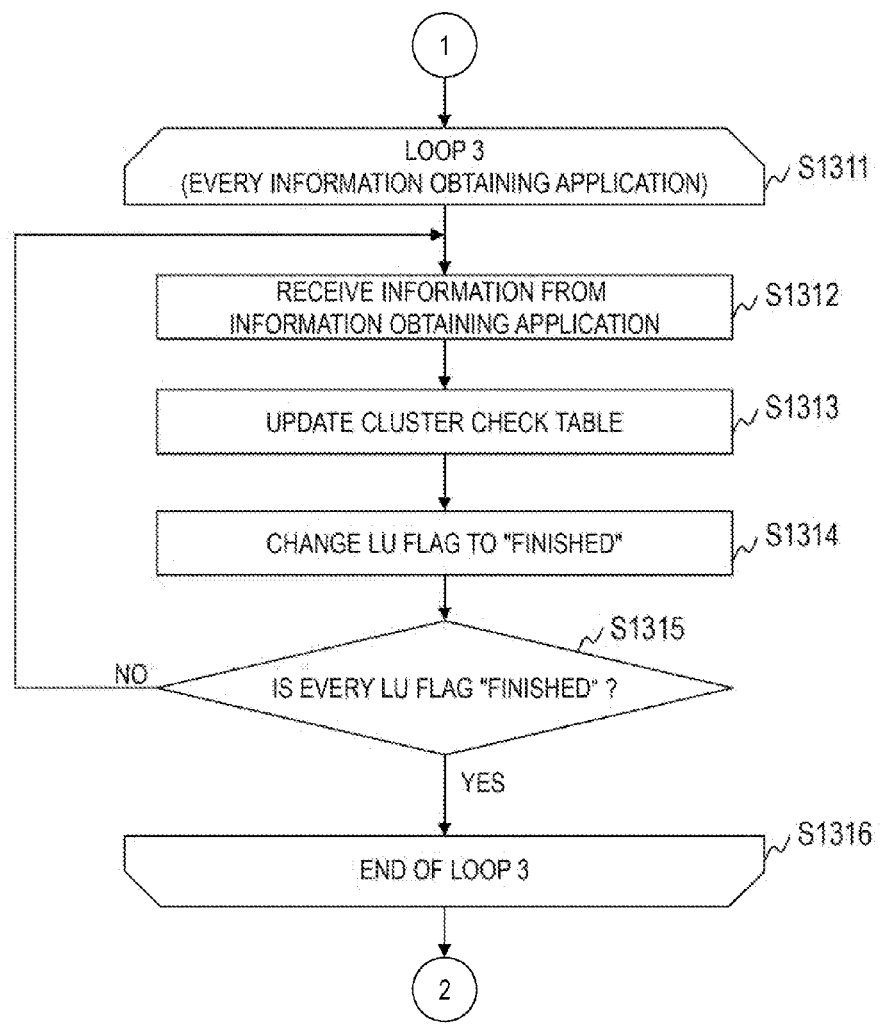
Figure 13C:
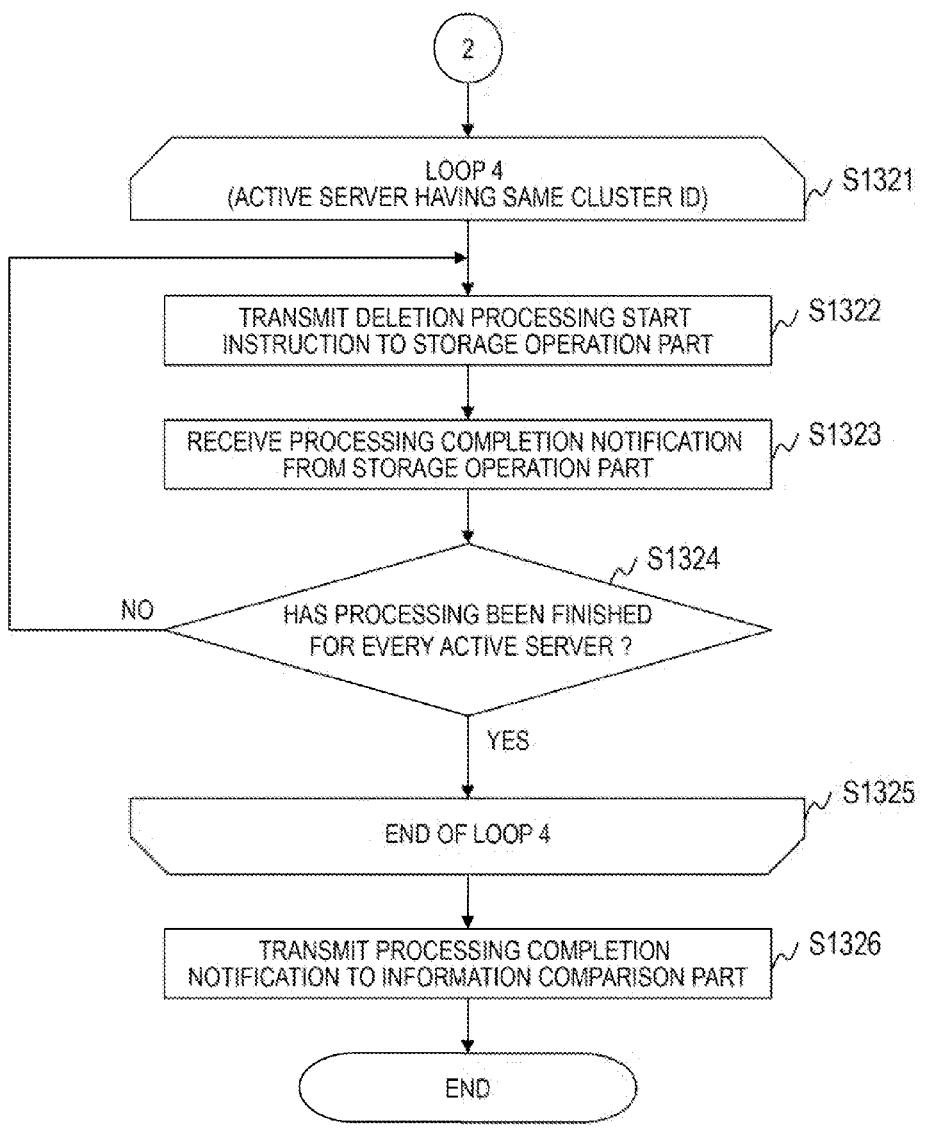

FIGS. 13A, 13B, and 13C are flow charts illustrating an example of processing executed by the information reception part 214 of the management server 100 according to the first embodiment of this invention.

The information reception part 214 refers to the management target table 250 based on the received identifier of the cluster (Step S1301) to obtain the WWN of the standby server 120 belonging to the cluster corresponding to the received identifier of the cluster (Step S1302).

To be specific, the information reception part 214 searches for the entry whose cluster ID 508 matches the received identifier of the cluster. The information reception part 214 selects the entry whose type 509 is "Standby" among the retrieved entries. Moreover, the information reception part 214 obtains the WWN of the standby server 120 from the WWN 505 of the selected entry. In a case where a plurality of standby servers 120 belong to the cluster, the information reception part 214 obtains a plurality of WWNs.

Processing from Steps S1303 to S1308 is loop processing on the active servers 120 belonging to the cluster, and is repeatedly executed until the processing is finished for every active server 120 belonging to the cluster.

The information reception part 214 selects one active server 120 belonging to the cluster corresponding to the received identifier of the cluster, and obtains the WWN of the selected active server 120 (Step S1304).

To be specific, the information reception part 214 refers to the management target table 250 to obtain the WWN of the active server 120 from the WWN 505 of the entry of the active server 120 belonging to the cluster in question.

The information reception part 214 transmits an addition processing start instruction to the storage operation part 216 (Step S1305). The addition processing start instruction includes the WWN of the active server 120 obtained in Step S1304 and the WWN of every standby server 120 obtained in Step S1302. The information reception part 214 waits until receiving the processing completion notification from the storage operation part 216.

In a case of receiving the processing completion notification from the storage operation part 216 (Step S1306), the information reception part 214 determines whether or not the processing has been finished for every active server 120 belonging to the cluster corresponding to the received identifier of the cluster (Step S1307).

In a case where it is determined that the processing has not been finished for every active server 120 in question, the information reception part 214 returns to Step S1305 and newly selects the active server 120, and executes similar processing.

In a case where it is determined that the processing has been finished for every active server 120 in question, the information reception part 214 transmits the instruction to activate the information obtaining application 123 to each standby server 120 belonging to the cluster corresponding to the received identifier of the cluster (Step S1309).

Processing from Steps S1311 to S1316 is repeatedly executed until the processing is finished for every standby server 120 belonging to the cluster.

The information reception part 214 receives from the standby server 120 the verification-use configuration information obtained by the information obtaining application 123 (Step S1312).

The received verification-use configuration information at least includes the information on the LU 135 accessed by the active server 120 and the information obtaining time. It should be noted that the received verification-use configuration information may also include such information as the server model and number of I/Os of the active server 120 or standby server 120.

It should be noted that the standby server 120 transmits its own identifier along with the information obtained by the information obtaining application 123. In this way, the information reception part 214 can determine a specific standby server 120 that has transmitted the verification-use configuration information.

The information reception part 214 updates the cluster check table 251 based on the received verification-use configuration information (Step S1313).

To be specific, the information reception part 214 stores the information on the LU 135 included in the verification-use configuration information in the obtained information 609 and stores the information obtaining time included in the verification-use configuration information in the obtaining time 610.

It should be noted that the information obtaining application 123 running on one standby server 120 can obtain the information of the LU 135 and the like of a plurality of active servers 120 forming a pair with the one standby server 120. Accordingly, in a case of receiving a plurality of pieces of verification-use configuration information, the information reception part 214 updates as many entries as the number of received pieces of verification-use configuration information.

The information reception part 214 changes the LU flag 606 of the updated entry of the cluster check table 251 to "Finished" (Step S1314).

The LU flag 606 is changed here in order to avoid redundant obtaining of the same verification-use configuration information because the information obtaining application 123 running on one standby server 120 obtains the information of the LU 135 and the like of the plurality of active servers 120. In other words, the LU flag 606 is changed in order to inhibit obtaining of the same information, in a case where the information is obtained for each check pair.

The information reception part 214 determines whether or not the LU flag 606 is "Finished" in every entry corresponding to the received identifier of the cluster (Step S1315).

In a case where it is determined that the LU flag 606 is not "Finished" in every entry in question, the information reception part 214 returns to Step S1312 and execute similar processing. It should be noted that, because there may conceivably be a case where the information is not transmitted from the standby server 120, the information reception part 214 may proceed to Step 1316 after a predetermined period of time elapses.

In a case where it is determined that the LU flag 606 is "Finished" in every entry in question, the information reception part 214 brings the loop processing on the information obtaining application 123 to an end (Step S1316), and selects one active server 120 belonging to the cluster corresponding to the received identifier of the cluster (Step S1321). Processing from Steps S1321 to S1325 is loop processing on the active server 120, and is repeatedly executed until the processing is finished for every active server 120 in question.

The information reception part 214 transmits a deletion processing start instruction to the storage operation part 216 (Step S1322). The deletion processing start instruction includes the WWN of the selected active server 120 and the WWN of every standby server 120 obtained in Step 1302. After transmitting the deletion processing start instruction, the information reception part 214 waits until receiving the processing completion notification from the storage operation part 216.

In a case of receiving the processing completion notification from the storage operation part 216 (Step S1323), the information reception part 214 determines whether or not the processing has been finished for every active server 120 belonging to the cluster corresponding to the received identifier of the cluster (Step S1324).

In a case where it is determined that the processing has not been finished for every active server 120 in question, the information reception part 214 returns to Step S1322 and selects another active server 120, and executes the same processing.

In a case where it is determined that the processing has been finished for every active server 120 in question, the information reception part 214 transmits the processing completion notification to the information comparison part 213 (Step S1326), and brings the processing to an end.

Figure 14:
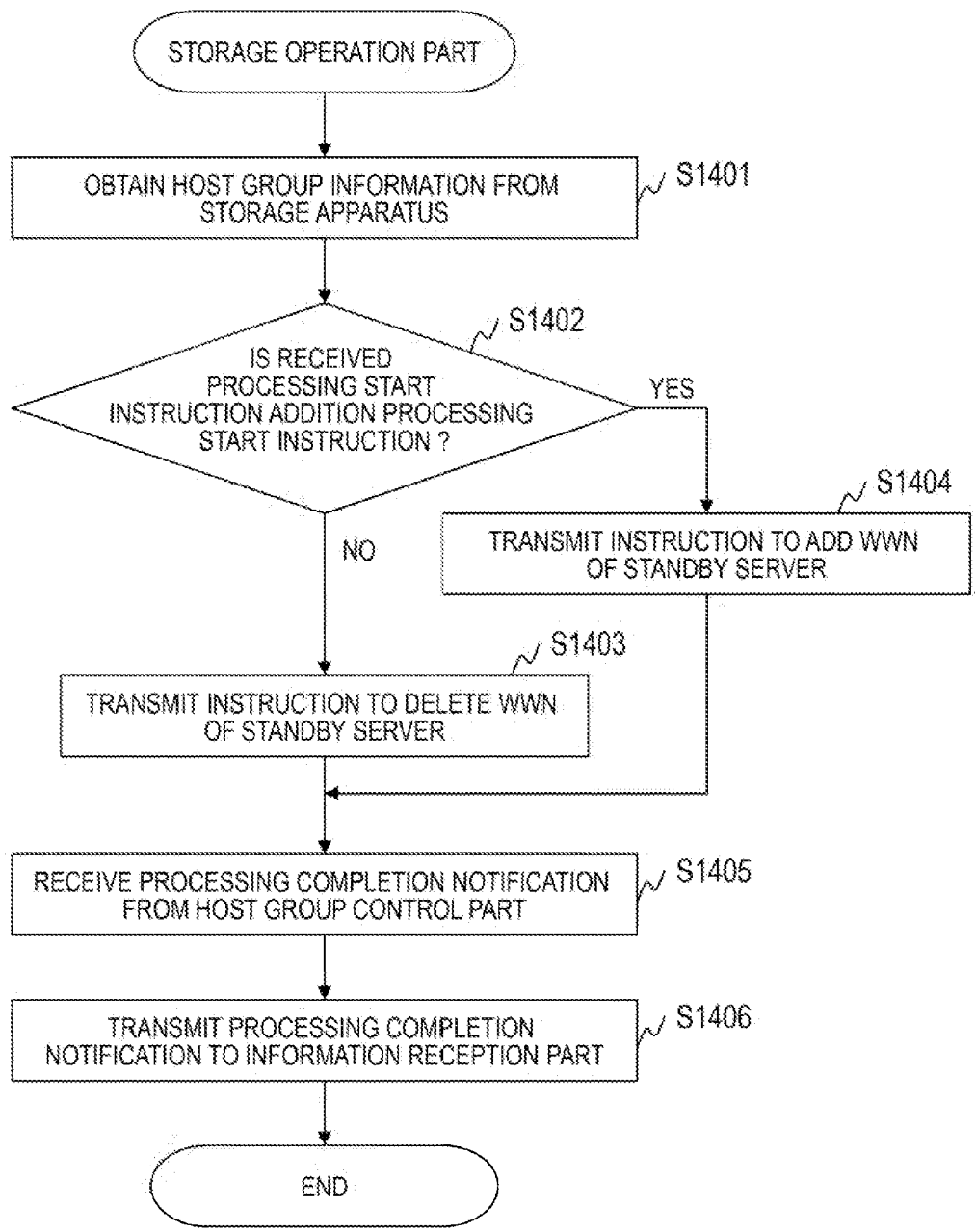
FIG. 14 is a flow chart illustrating an example of processing executed by a storage operation part of the management server according to the first embodiment of this invention.

FIG. 14 is a flow chart illustrating an example of processing executed by the storage operation part 216 of the management server 100 according to the first embodiment of this invention.

The storage operation part 216 starts the processing, in a case of receiving the processing start instruction from the information reception part 214.

The storage operation part 216 obtains from the storage apparatus 130 information on the host group to which the active server 120 belongs, which is included in the received processing start instruction (Step S1401).

To be specific, the storage operation part 216 issues an inquiry including the WWN of the active server 120 to the storage apparatus 130.

The storage apparatus 130 at this time searches the host group table 412 for the host group ID 701 to which the active server 120 belongs based on the WWN of the active server 120 included in the inquiry. The storage apparatus 130 further transmits a response including the host group ID 701 to the storage operation part 216.

It should be noted that the processing of Step S1401 can be omitted in a case where the host group ID 701 and other such information associated with the WWN of the active server 120 is included in the management target table 250. In this case, the storage operation part 216 can directly specify the host group ID 701.

The storage operation part 216 determines whether or not the received processing start instruction is the addition processing start instruction (Step S1402).

In a case where it is determined that the received processing start instruction is not the addition processing start instruction, in other words, that the received processing start instruction is the deletion processing start instruction, the storage operation part 216 transmits an instruction to delete the WWN of the standby server 120 to the host group control part 411 (Step S1403).

To be specific, the storage operation part 216 instructs the host group control part 411 to delete the WWN of the standby server 120 from the host group corresponding to the obtained host group ID 701. This instruction includes the obtained host group ID 701. After transmitting the instruction, the storage operation part 216 waits until receiving the processing completion notification from the host group control part 411.

It should be noted that the above-mentioned processing may be omitted and the storage operation part 216 may proceed to Step 1405 in a case where it is not necessary to delete the WWN of the standby server.

In a case where it is determined that the received processing start instruction is the addition processing start instruction, the storage operation part 216 transmits an instruction to add the WWN of the standby server 120 to the host group control part 411 (Step S1404).

To be specific, the storage operation part 216 instructs the host group control part 411 to add, to the host group corresponding to the obtained host group ID 701, the WWN of the standby server 120 with the reference authority assigned thereto. This instruction includes the obtained host group ID 701 and the WWN of the standby server 120. After transmitting the instruction, the storage operation part 216 waits until receiving the processing completion notification from the host group control part 411.

In a case of receiving the processing completion notification from the host group control part 411 (Step S1405), the storage operation part 216 transmits the processing completion notification to the information reception part 214 (Step S1406). After that, the storage operation part 216 brings the processing to an end.

It should be noted that, although the storage operation part 216 transmits the operation instruction to the host group control part 411 in order to update the host group table 412 in this embodiment, this invention is not limited thereto.

For example, the storage operation part 216 may use an application program interface (API) in order to transmit a specific operation instruction to the host group table 412. Alternatively, the storage operation part 216 may obtain the host group table 412, and use the API in order to add/delete the WWN of the standby server 120 to/from the host group table 412.

Figure 15:
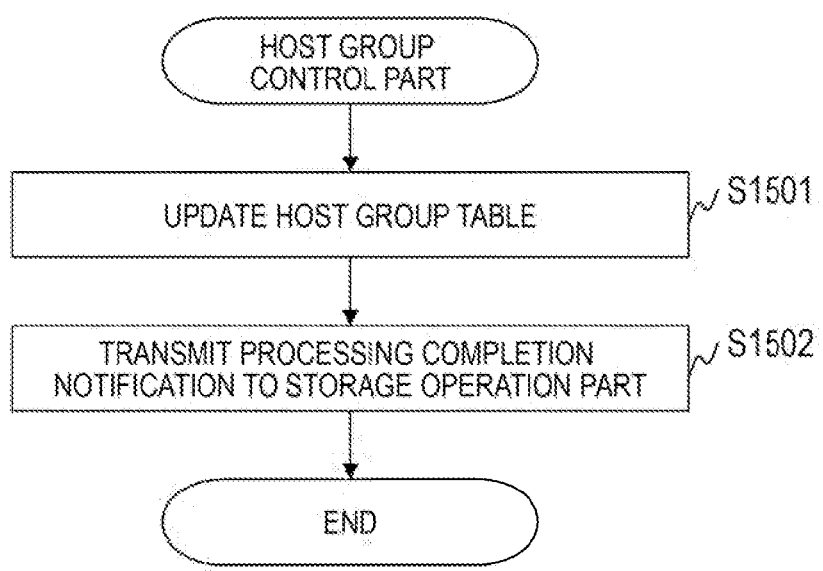
FIG. 15 is a flow chart illustrating an example of processing executed by a host group control part of the storage apparatus according to the first embodiment of this invention.

FIG. 15 is a flow chart illustrating an example of processing executed by the host group control part 411 of the storage apparatus 130 according to the first embodiment of this invention.

The host group control part 411 starts the processing, in a case of receiving the operation instruction from the storage operation part 216.

The host group control part 411 updates the host group table 412 in accordance with the received operation instruction (Step S1501). The processing is branched as follows depending on the received operation instruction.

In a case where the received operation instruction is a deletion instruction, the host group control part 411 searches for the entry of the host group to be a target of deletion based on the host group ID 701 included in the deletion instruction. The host group control part 411 deletes, from the retrieved entry of the host group, the WWN of the standby server 120 included in the deletion instruction.

In a case where the received operation instruction is an addition instruction, the host group control part 411 searches for the entry of the host group to be a target of addition based on the host group ID 701 included in the addition instruction. The host group control part 411 adds, to the retrieved entry of the host group, the WWN of the standby server 120 included in the addition instruction.

At this time, the same controller ID, port ID, and LU ID as those of the entries of other WWNs are stored in the controller ID 703, the port ID 704, and the LU ID 705, respectively. In addition, the value "Read" indicating the reference authority is stored in the authority 706.

It should be noted that, in a case where the storage operation part 216 uses the API in order to transmit the specific operation instruction, the host group control part 411 does not need to execute the above-mentioned processing, and adds or deletes the WWN of the standby server 120 in accordance with the received operation instruction.

The processing of Step S1501 is as described above.

After the host group table 412 is updated, the host group control part 411 transmits the processing completion notification to the storage operation part 216 (Step S1502), and brings the processing to an end.

Figure 16:
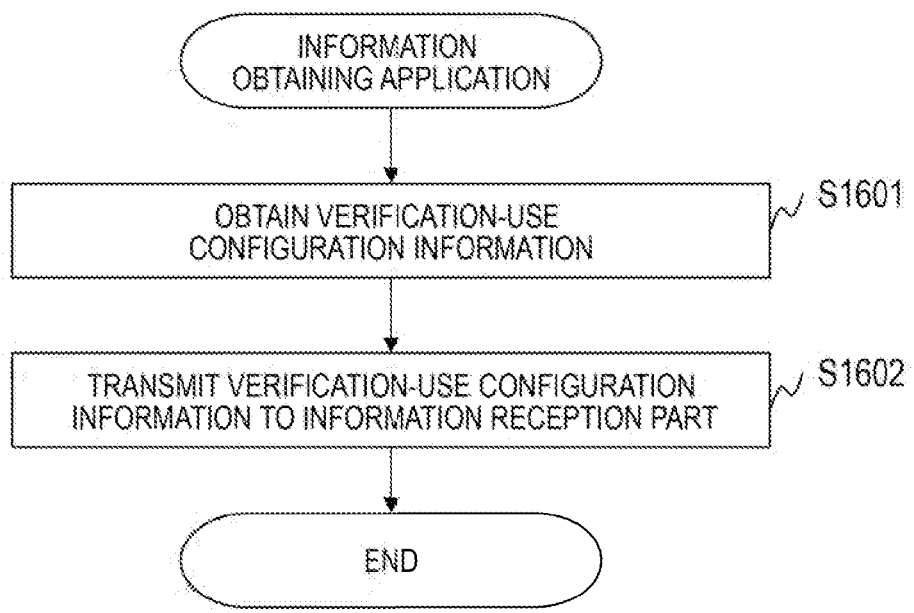
FIG. 16 is a flow chart illustrating an example of processing executed by an information obtaining application according to the first embodiment of this invention.

FIG. 16 is a flow chart illustrating an example of processing executed by the information obtaining application 123 according to the first embodiment of this invention.

The standby server 120 activates the information obtaining application 123, in a case of receiving the activation instruction from the information reception part 214.

The information obtaining application 123 obtains the verification-use configuration information (Step S1601). To be specific, the following processing is executed.

In a case of obtaining the information on the LU 135 included in the verification-use configuration information, the information obtaining application 123 issues a predetermined command to the storage apparatus 130. The predetermined command may conceivably be, for example, a command for obtaining the "Inquiry" information. The information obtaining application 123 at this time calculates a time of response to the command as the information obtaining time.

Alternatively, the information obtaining application 123 may mount the LU 135 and refer to the information stored in the LU 135 in order to obtain the information stored in the LU 135. Still alternatively, a program for verification may be stored in advance in the LU 135 accessed by the active server 120, and the program may be executed in order to obtain the information.

The information obtaining application 123 transmits the obtained verification-use configuration information to the information reception part 214 (Step S1602), and brings the processing to an end.

It should be noted that, after the processing is brought to an end, the standby server 120 may turn its power to an OFF state. Alternatively, the standby server 120 may change the setting so that the information obtaining application 123 is not activated.

It should be noted that the information obtaining application 123 may obtain the configuration information such as the LU information of the active server 120 from the management server 100 in advance, and compare the obtained configuration information with the verification-use configuration information in order to determine whether or not the failover is implementable. The same processing as that of Step S1207 only needs to be used as the failover implementability determination processing.

In this case, the information comparison part 213 does not need to execute the comparison processing in Step S1207, and only needs to determine whether or not the failover is implementable based on a determination result transmitted from the information obtaining application 123.

Figure 17:
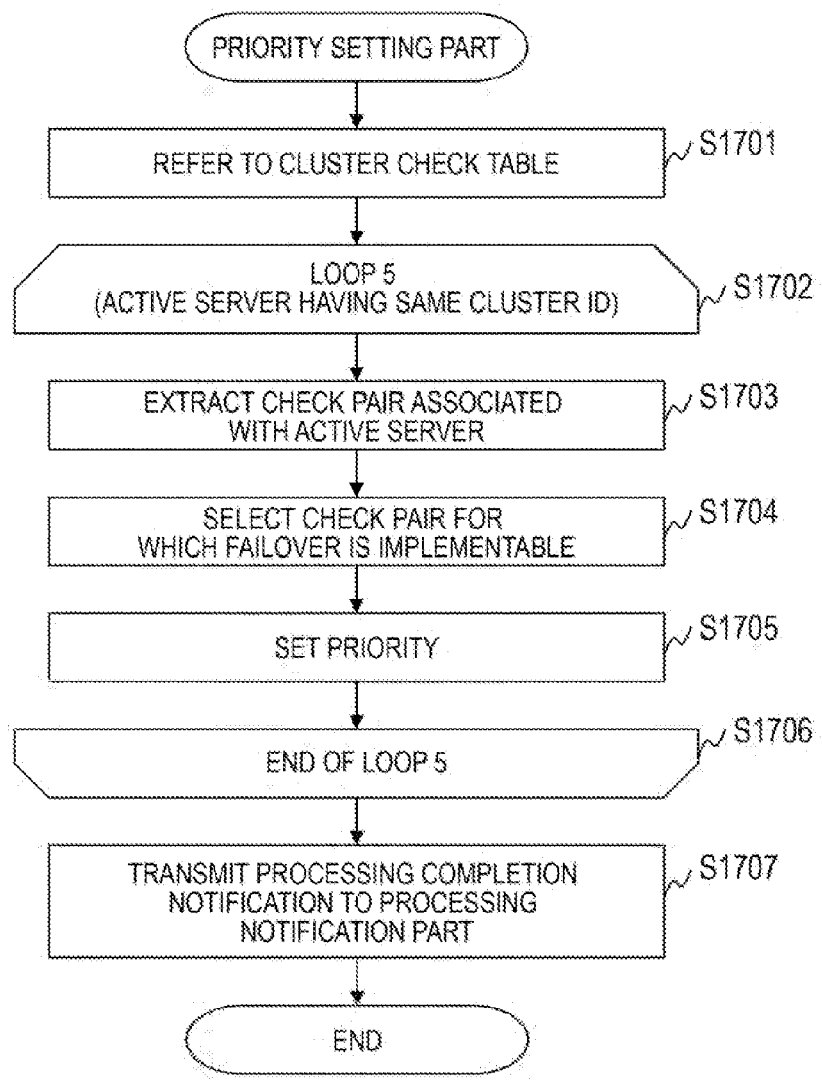
FIG. 17 is a flow chart illustrating an example of processing executed by a priority setting part of the management server according to the first embodiment of this invention.

FIG. 17 is a flow chart illustrating an example of processing executed by the priority setting part 217 of the management server 100 according to the first embodiment of this invention.

The priority setting part 217 starts the processing, in a case of receiving the processing completion notification from the information comparison part 213.

The priority setting part 217 refers to the cluster check table 251 based on the identifier of the cluster included in the received processing completion notification (Step S1701).

The priority setting part 217 selects one active server 120 belonging to the cluster corresponding to the received identifier of the cluster (Step S1702). Processing from Steps S1702 to S1706 is loop processing on the active server 120, and is repeatedly executed until the processing is finished for every active server 120 in question.

The priority setting part 217 extracts the check pair associated with the selected active server 120 (Step S1703).

To be specific, the priority setting part 217 refers to the cluster check table 251 to search for the entry whose active server ID 603 matches the identifier of the selected active server 120.

The priority setting part 217 selects the check pair for which it is determined that the failover is implementable from among the retrieved check pairs (Step S1704).

To be specific, the priority setting part 217 selects the entry that stores "Implementable" as the verification result 607 from among the entries corresponding to the retrieved check pairs.

The priority setting part 217 sets the priority for the selected check pair (Step S1705).

To be specific, the priority setting part 217 refers to the obtaining time 610 of the entry corresponding to the selected check pair to set a higher priority in ascending order of the value of the obtaining time. In this embodiment, the priority is represented by a numerical value, and the setting is made so that a smaller numerical value represents a higher priority and a larger numerical value represents a lower priority.

It should be noted that, for the check pair having the same value of the obtaining time 610, the priority setting part 217 may set the priority based on the pair ID 601 or the standby server ID 604. For example, a method in which a higher priority is set for the entry having a smaller pair ID 601 is conceivable.

In a case where the processing has been finished on every active server 120 (Step S1706), the priority setting part 217 transmits the processing completion notification to the processing notification part 218 (Step S1707), and brings the processing to an end.

Figure 18:
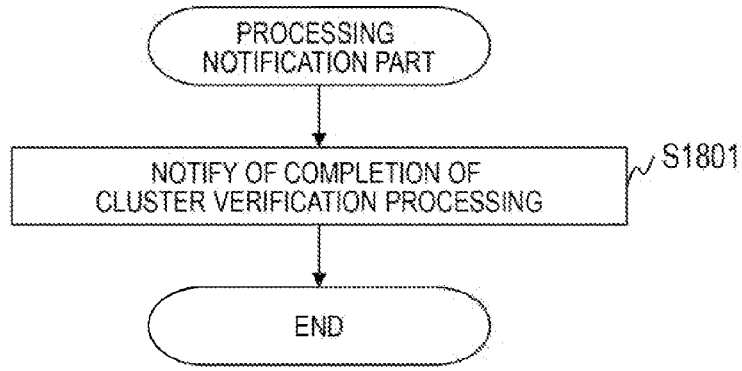
FIG. 18 is a flow chart illustrating an example of processing executed by a processing notification part of the management server according to the first embodiment of this invention.

FIG. 18 is a flow chart illustrating an example of processing executed by the processing notification part 218 of the management server 100 according to the first embodiment of this invention.

The processing notification part 218 starts the processing, in a case of receiving the processing completion notification from the priority setting part 217.

The processing notification part 218 notifies the administrator of the fact that the cluster verification processing is completed (Step S1801), and brings the processing to an end.

As a notification method, a processing result may be displayed on an output apparatus such as a display included in the management server 100, or a processing result may be displayed on a display or the like of the client terminal 190. A method in which an e-mail or alert is transmitted to the administrator is also conceivable.

According to the first embodiment, it is possible to determine whether or not the failover is implementable without actually executing the failover processing between the active server 120 and the standby server 120.

<Modification Example>

In the first embodiment, in the determination processing of Step S1207, the information comparison part 213 compares the information on the LU 135 accessed by the active server 120 with the information on the LU 135 accessible by the standby server 120 in order to determine whether or not the failover is implementable. This invention is not limited thereto, and the following method may also be adopted.

In Step S1601, the information obtaining application 123 on the standby server 120 transmits to the storage apparatus 130 a command for inquiring whether or not the LU 135 is accessible by the standby server 120. This command includes the WWN of the standby server 120.

In a case of receiving the inquiry command, the host group control part 411 of the storage apparatus 130 transmits a response to the command to the information obtaining application 123.

In Step 1602, in a case of receiving the response from the storage apparatus 130, the information obtaining application 123 transmits a notification that the failover is implementable to the information reception part 214.

It is possible to determine whether or not the failover is implementable more quickly than the processing of the first embodiment by executing the above-mentioned processing.

<Second Embodiment>

In the first embodiment, the standby server 120 stores the information obtaining application 123 in advance. In a second embodiment of this invention, however, the management server 100 stores the information obtaining application 123, which is a difference from the first embodiment.

The configuration of the computer system of the second embodiment and the hardware configuration and software configuration of the management server 100, server 120, and storage apparatus 130 of the second embodiment are the same as those of the first embodiment, and descriptions thereof are therefore omitted. In the following, a description is given with a focus on the difference from the first embodiment.

In the second embodiment, the Preboot eXecution Environment (PXE) boot function of the standby server 120 is used in order to activate the information obtaining application 123. To be specific, the management server 100 activates the standby server 120 via the management network, and transmits the information obtaining application 123 to the activated standby server 120.

In the second embodiment, the processing of Step 1309 is changed.

The information reception part 214 instructs the standby server 120 belonging to the cluster corresponding to the received identifier of the cluster to activate the standby server 120 itself. It should be noted that the activation instruction includes an instruction to turn ON the power.

In a case of receiving from the activated standby server 120 a request to transmit the information obtaining application 123, the information reception part 214 transmits the information obtaining application 123 to the activated standby server 120.

The processing of each of the other constituent parts is the same as that of the first embodiment, and a description thereof is therefore omitted.

According to the second embodiment, it is possible to eliminate time and labor for storing the information obtaining application 123 in the standby server 120 in advance to reduce storage resources of the standby server 120 for storing the information obtaining application 123. It is also possible to eliminate time and labor for making settings of the BIOS or UEFI in order to activate the information obtaining application 123.

<Third Embodiment>

In a third embodiment of this invention, the information obtaining application 123 is stored in a dedicated storage area of the storage apparatus 130, which is a difference from the first embodiment.

The configuration of the computer system of the third embodiment and the hardware configuration and software configuration of the management server 100, server 120, and storage apparatus 130 of the third embodiment are the same as those of the first embodiment, and descriptions thereof are therefore omitted. In the following, a description is given with a focus on the difference from the first embodiment.

In the third embodiment, the standby server 120 obtains the information obtaining application 123 from the dedicated storage area of the storage apparatus 130, and activates the obtained information obtaining application 123.

It should be noted that the dedicated storage area may be prepared in advance in the storage apparatus 130, or the LU for storing the information obtaining application 123 may be generated as necessary. In the third embodiment, a test-use LU for storing the information obtaining application 123 is generated in the storage apparatus 130.

In addition, in the third embodiment, an entry of the host group to which the test-use LU belongs is added to the host group table 412.

In the third embodiment, the processing of Step S1403 and Step S1404 is changed.

In the processing of Step S1404, the storage operation part 216 instructs the host group control part 411 to add the WWN of the standby server 120 to the host group to which the test-use LU belongs and the host group corresponding to the obtained host group ID 701 with the reference authority assigned thereto.

In addition, in the processing of Step 1403, the storage operation part 216 instructs the host group control part 411 to delete the WWN of the standby server 120 from the host group to which the test-use LU 135 belongs and the host group corresponding to the obtained host group ID 701.

It should be noted that, in order to maintain a state in which the test-use LU is coupled, it is not necessary to delete the WWN of the standby server 120 from the host group to which the test-use LU belongs. Further, the WWN of the standby server may be registered in advance in the host group to which the test-use LU belongs.

The processing of each of the other constituent parts is the same as that of the first embodiment, and a description thereof is therefore omitted.

According to the third embodiment, it is possible to eliminate time and labor for storing the information obtaining application 123 in the standby server 120 in advance to reduce storage resources of the standby server for storing the information obtaining application 123. It is also possible to eliminate time and labor for making settings of the BIOS or UEFI in order to activate the information obtaining application 123.

<Fourth Embodiment>

In a fourth embodiment of this invention, the information obtaining application 123 is stored in advance in an external storage apparatus coupled to the standby server 120, which is a difference from the first embodiment.

The configuration of the computer system and the hardware configuration and software configuration of the management server 100, server 120, and storage apparatus 130 are the same as those of the first embodiment, and descriptions thereof are therefore omitted. In the following, a description is given with a focus on the difference from the first embodiment.

In the fourth embodiment, the standby server 120 obtains the information obtaining application from the external storage apparatus, and activates the obtained information obtaining application. It should be noted that the external storage apparatus may conceivably be a storage device such as a non-volatile semiconductor memory, an HDD, or a SSD, or a computer-readable non-transitory storage medium such as an IC card, an SD card or a DVD.

In the fourth embodiment, the processing of Step 1309 is changed.

In the processing of Step 1309, the information reception part 214 activates the standby server 120 belonging to the cluster corresponding to the received identifier of the cluster. It should be noted that the activation instruction includes an instruction to turn ON the power.

In addition, the information reception part 214 changes an activation order (boot order) of the standby server 120 so that the information obtaining application 123 is activated from the external storage apparatus storing the information obtaining application 123. For example, the information reception part 214 may use the BIOS or UEFI of the standby server 120 in order to change the activation order.

The processing of each of the other constituent parts is the same as that of the first embodiment, and a description thereof is therefore omitted.

According to the fourth embodiment, it is possible to run the information obtaining application 123 on the standby server 120 by coupling the external storage apparatus to the standby server 120.

<Fifth Embodiment>

In a fifth embodiment of this invention, the information obtaining application 123 is stored in the LU 135 accessed by the active server 120, which is a difference from the first embodiment.

The configuration of the computer system and the hardware configuration and software configuration of the management server 100, server 120, and storage apparatus 130 are the same as those of the first embodiment, and descriptions thereof are therefore omitted. In the following, a description is given with a focus on the difference from the first embodiment.

In the fifth embodiment, the standby server 120 obtains the information obtaining application 123 from the LU 135 accessed by the active server 120, and activates the obtained information obtaining application 123.

In the fifth embodiment, the LU 135 accessed by the active server 120 includes the storage area used by the active server 120 and a storage area for storing the information obtaining application 123. A conceivable method in this case is the one in which at the time of generating the LU 135, the storage apparatus 130 generates a dedicated storage area in the LU 135 and stores the information obtaining application 123 in the generated dedicated storage area.

In the fifth embodiment, the processing of Step 1309 is changed.

In the processing of Step 1309, the information reception part 214 activates the standby server 120 belonging to the cluster corresponding to the received identifier of the cluster. It should be noted that the activation instruction includes an instruction to turn ON the power.

In addition, the information reception part 214 instructs the standby server 120 to activate the information obtaining application 123 from the dedicated storage area. For example, the information reception part 214 can use the BIOS or UEFI of the standby server 120 in order to change the storage area for activating the information obtaining application 123.

Alternatively, the information obtaining application 123 may store the obtained verification-use configuration information in the dedicated storage area, and the management server 100 may obtain the verification-use configuration information from the dedicated storage area.

It should be noted that the processing of each of the other constituent parts is the same as that of the first embodiment, and a description thereof is therefore omitted.

According to the fifth embodiment, it is possible to run the information obtaining application 123 on the standby server 120 without the need for the standby server 120 to store the information obtaining application 123.

<Sixth Embodiment>

In the first embodiment, the priority is set based on the obtaining time 610. In the sixth embodiment, however, the priority is set based on performance information on the port 134 of the storage apparatus 130, which is a difference from the first embodiment.

The configuration of the computer system and the hardware configuration and software configuration of the server 120 and storage apparatus 130 are the same as those of the first embodiment, and descriptions thereof are therefore omitted. In the following, a description is given with a focus on the difference from the first embodiment.

The sixth embodiment differs from the first embodiment in the cluster check table 251 stored in the management server 100. It should be noted that the hardware configuration and other software configurations of the management server 100 are the same as those of the first embodiment, and descriptions thereof are therefore omitted.

FIGS. 19A and 19B are explanatory diagrams illustrating an example of the cluster check table 251 according to the sixth embodiment of this invention.

The cluster check table 251 of the sixth embodiment differs from that of the first embodiment in including a storage ID 1901 and a port ID 1902.

The storage ID 1901 stores an identifier for uniquely identifying the storage apparatus 130 coupled to the standby server 120. The port ID 1902 stores an identifier for uniquely identifying the port 134 of the storage apparatus 130. The standby server 120 accesses the LU 135 via the port 134 corresponding to the port ID 1902.

Figure 20:
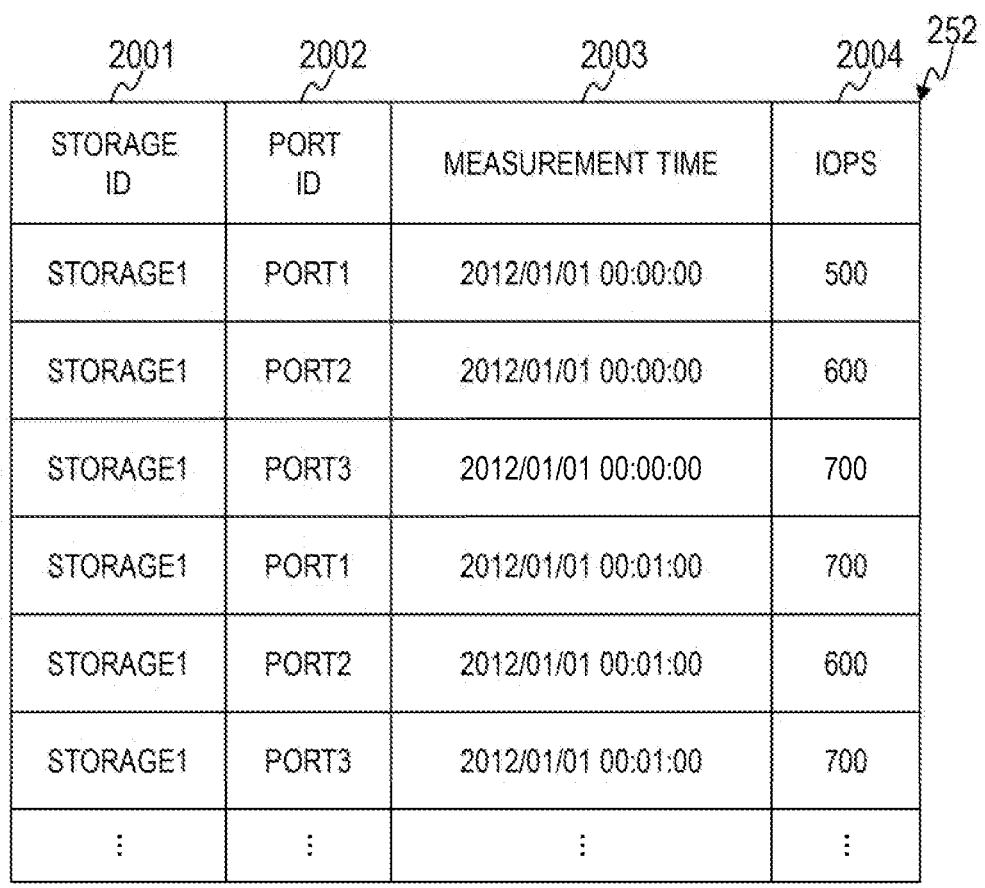
FIG. 20 is an explanatory diagram illustrating an example of a port performance table according to the sixth embodiment of this invention.

FIG. 20 is an explanatory diagram illustrating an example of the port performance table 252 according to the sixth embodiment of this invention.

The port performance table 252 stores performance information on the port 134 used by the server 120 to couple to the storage apparatus 130. To be specific, the port performance table 252 includes a storage ID 2001, a port ID 2002, a measurement time 2203, and an IOPS 2004.

The storage ID 2001 and the port ID 2002 are the same as the storage ID 1901 and the port ID 1902, respectively. It should be noted that data stored in the storage ID 2001 can be omitted by designating any one of the columns used in this table or a combination of a plurality of columns of the table. Further, the management server 100 may automatically assign, as their identifiers, the respective storage apparatus 130 with identification numbers in ascending order.

The measurement time 2003 stores a measurement time of the performance information on the port 134. It should be noted that the measurement time may be a time at which the performance information is obtained in the storage apparatus 130, or may be a time at which the management server 100 obtains the performance information via the management interface 131 of the storage apparatus 130.

The IOPS 2004 stores the performance information on the port 134. In this embodiment, an input/output per second (IOPS) is used as the performance information on the port 134. The LOPS used here is an index representing a usage status at the measurement time 2003. Although the IOPS is used in this embodiment, a transfer amount of read data, a transfer amount of write data, or the like may be used as the performance information on the port 134.

A description is given below of processing executed by the priority setting part 217 of the sixth embodiment.

The processing from Steps S1701 to S1704 is the same as that of the first embodiment.

After the processing of Step S1704, the priority setting part 217 obtains the storage ID 1901 and the port ID 1902 from the entry corresponding to the selected check pair.

The priority setting part 217 refers to the port performance table 252 based on the obtained storage ID 1901 and port ID 1902 to search for the entry whose storage ID 2001 and port ID 2002 match the obtained storage ID 1901 and port ID 1902, respectively. The priority setting part 217 further obtains the value of the IOPS from the IOPS 2004 of the retrieved entry.

After that, in Step S1705, the priority setting part 217 sets the priority based on the obtained value of the IOPS.

To be specific, the priority setting part 217 compares the values of the IOPSs 2004 of the entries having the earliest measurement time 2003 with one another, and sets a higher priority in ascending order of the value of the IOPS 2004.

It should be noted that the priority setting part 217 may calculate a value such as, an average value or change amount of the IOPS of the same port during the same period, and set the priority based on the calculated value.

The processing from Steps S1706 and S1707 is the same as that of the first embodiment, and a description thereof is therefore omitted. Further, the processing of other constituent parts is the same as that of the first embodiment, and a description thereof is therefore omitted.

According to the sixth embodiment, by referring to the performance information on the port of the storage apparatus 130, it is possible to prevent the performance of the standby server from deceasing after the failover to affect the service executed on the standby server 120 before such situation occurs.

<Seventh Embodiment>

In the first embodiment, the priority is set based on the obtaining time 610. In the seventh embodiment, however, the priority is set based on a cost generated on a network path coupling the standby server 120 and the storage apparatus 130 to each other, specifically, a path cost, which is a difference from the first embodiment.

The configuration of the computer system and the hardware configuration and software configuration of the server 120 and storage apparatus 130 are the same as those of the first embodiment, and descriptions thereof are therefore omitted. In the following, a description is given with a focus on the difference from the first embodiment.

The seventh embodiment differs from the first embodiment in the cluster check table 251 stored in the management server 100. It should be noted that the hardware configuration and other software configurations of the management server 100 are the same as those of the first embodiment, and descriptions thereof are therefore omitted.

FIGS. 21A and 21B are explanatory diagrams illustrating an example of the cluster check table 251 according to the seventh embodiment of this invention.

The cluster check table 251 of the seventh embodiment differs from that of the first embodiment in including the storage ID 1901, the port ID 1902, and a path cost 2101. The storage ID 1901 and the port ID 1902 have been described above in the sixth embodiment, and descriptions thereof are therefore omitted.

It should be noted that, in order to simplify the description, the check flag 605, the LU flag 606, the verification result 607, and the reason 608 are not shown in FIGS. 21A and 21B.

The path cost 2101 stores the value of a cost of the network path coupling the standby server 120 and the storage apparatus 130 to each other, specifically, the value of the path cost. The path cost is an index representing the shortest network path. The path cost may conceivably be, for example, the number of hops on the network path or the number of switches included in the network path.

A description is given below of processing executed by the priority setting part 217 of the seventh embodiment.

The processing from Steps S1701 to S1704 is the same as that of the first embodiment.

After the processing of Step S1704, the priority setting part 217 obtains the standby server ID 604, the storage ID 1901, and the port ID 1902 from the entry corresponding to the selected check pair.

The priority setting part 217 issues to the network management part 111 an inquiry about the path cost including the obtained standby server ID 604, storage ID 1901, and port ID 1902.

The priority setting part 217 waits until receiving a response about every standby server 120 from the network management part 111. In a case of receiving the response from the network management part 111, the priority setting part 217 further updates the path cost 2101 of the corresponding entry of the cluster check table 251 based on the received response.

After that, in Step S1705, the priority setting part 217 sets the priority based on the value of the path cost 2101.

To be specific, the priority setting part 217 compares the values of the path cost 2101 with one another, and sets a higher priority in ascending order of the value of the path cost 2101.

The processing from Steps S1706 and S1707 is the same as that of the first embodiment, and a description thereof is therefore omitted.

Next, a description is given of processing executed by the network management part 111.

Figure 22:
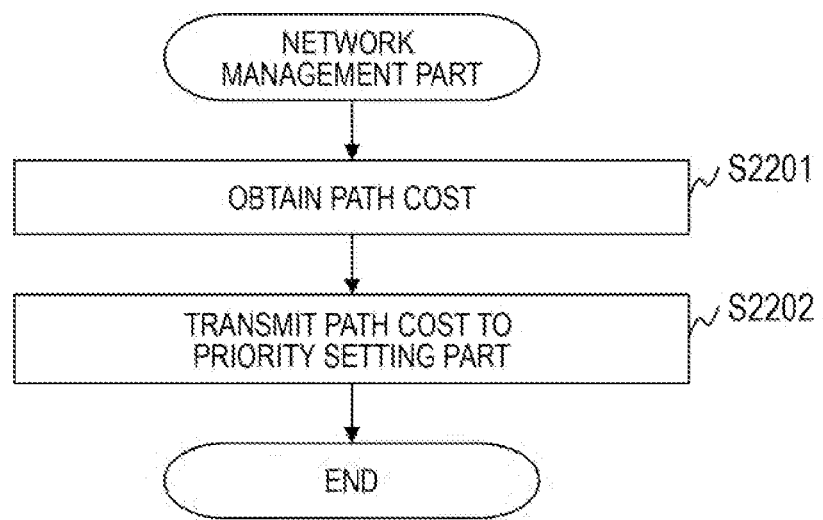
FIG. 22 is a flow chart illustrating an example of processing executed by a network management part of a NW-SW according to the seventh embodiment of this invention.

FIG. 22 is a flow chart illustrating an example of the processing executed by the network management part 111 of the NW-SW 110 according to the seventh embodiment of this invention.

The network management part 111 starts the processing, in a case of receiving the inquiry about the path cost from the priority setting part 217.

The network management part 111 obtains the path cost based on the standby server ID 604, storage ID 1901, and port ID 1902 included in the received inquiry (Step S2201).

A conceivable method is, for example, the one in which the network management part 111 stores information storing the identifier of the server 120, the identifier of the storage apparatus 130, the identifier of the port 134, and the configuration of the network path in association with one another, and obtains the number of switches included in the network path from the information as the path cost.

In this case, the network management part 111 specifies the network path between the standby server 120 and the storage apparatus 130 based on the received standby server ID 604, storage ID 1901, and port ID 1902. The network management part 111 counts the number of switches included in the specified network path to obtain the path cost.

The network management part 111 transmits the obtained path cost to the priority setting part 217 (Step S2202), and brings the processing to an end.

It should be noted that, although the NW-SW 110 includes the network management part 111 in the description given above, this invention is not limited thereto. For example, the management server 100 may include the network management part 111.

According to the seventh embodiment, by setting a higher priority for the standby server 120 coupled to the storage apparatus 130 via the network path having a lower path cost, the standby server 120 can run as the active server 120 having a high network performance after the failover processing. This is because a delay and the like do not occur in the communication between the server 120 and the storage apparatus 130 by virtue of a low path cost.

<Eighth Embodiment>

In the first embodiment, a plurality of clusters are built in advance and the cluster verification processing is executed on the existing clusters. In an eighth embodiment of this invention, in a case where the cluster is to be built, the management server 100 executes the failover implementability determination processing and presents a candidate for the server 120 to be used to build the cluster, which is a difference from the first embodiment.

The configuration of the computer system and the hardware configuration and software configuration of the management server 100, server 120, and storage apparatus 130 are the same as those of the first embodiment, and descriptions thereof are therefore omitted. In the following, a description is given with a focus on the difference from the first embodiment.

The eighth embodiment differs in pieces of processing executed by the trigger reception part 215, the check list generation part 211, and the processing notification part 218. In the following, descriptions are given of the respective pieces of processing.

The eighth embodiment differs in a trigger for starting the processing, which is received by the trigger reception part 215. To be specific, the administrator selects a candidate for the server 120 to be used to build the cluster in advance, and inputs an instruction to start the cluster verification processing including the identifier of the selected server 120.

The candidate for the server 120 to be selected may conceivably be two kinds of servers, specifically, the active server 120 and the standby server 120.

The administrator selects the active server 120, in a case where the administrator desires to realize a redundant system. In this manner, the selected server 120 is registered as the active server 120, and at the same time, the standby server 120 is retrieved to be a pair with the registered active server 120. The administrator selects the standby server 120, in a case where the administrator desires to make the configuration of the cluster more redundant in order to enhance a failure tolerance or the like.

It should be noted that, as the servers 120 to be selected, the administrator may designate all the servers 120 managed by the management server 100.

In a case of detecting the above-mentioned instruction to start the cluster verification processing, the trigger reception part 215 transmits the processing start instruction including the identifier of the server 120 selected as the candidate to the information obtaining part 212.

The eighth embodiment differs in a part of the processing executed by the check list generation part 211.

The check list generation part 211 starts the processing, in a case of receiving the processing completion notification from the information obtaining part 212. It should be noted that this notification includes the identifier of the server 120 selected by the administrator.

In the eighth embodiment, the processing of Step S1101 is not executed and the processing is started from Step S1102. This is because it is not necessary to search for the server 120 belonging to the cluster because the cluster is not built in the eighth embodiment.

In Step S1102, the check list generation part 211 generates the check pair based on the identifier of the server 120 included in the processing completion notification. For example, the following processing is conceivable.

The check list generation part 211 refers to the management target table 250 to search for the entry matching the received identifier of the server 120. The check list generation part 211 searches for at least one entry having the model 503 and the configuration information 504 that match those of the retrieved entry.

The other processing is the same as that of the first embodiment, and a description thereof is therefore omitted.

Figure 23:
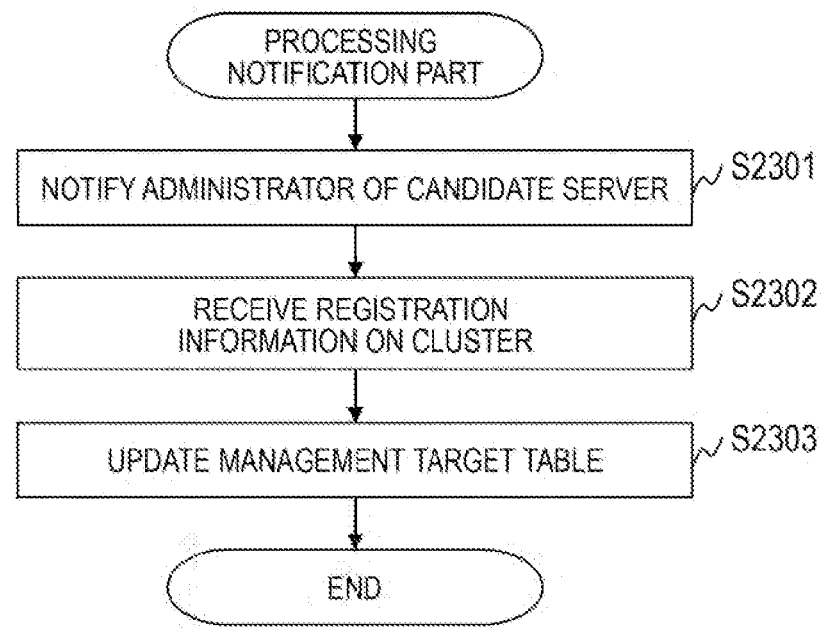
FIG. 23 is a flow chart illustrating an example of processing executed by the processing notification part of the management server according to an eighth embodiment of this invention.

FIG. 23 is a flow chart illustrating an example of processing executed by the processing notification part 218 of the management server 100 according to the eighth embodiment of this invention.

The processing notification part 218 notifies the administrator of information on a candidate server 120 for building the cluster (Step S2301).

To be specific, the processing notification part 218 transmits, as the information on the candidate server 120 for building the cluster, display information including information on the check pair for which the failover is implementable. A screen displayed based on the display information is described later with reference to FIG. 24.

The administrator uses an operation screen displayed on the client terminal 190 to select the server 120 for building the cluster. The client terminal 190 transmits to the management server 100 registration information on the cluster including the identifier of the server 120 selected by the administrator.

It should be noted that the registration information at least includes the identifier of the cluster, the identifier of the server 120 selected as the active server 120, and the identifier of the server 120 selected as the standby server 120.

In a case of receiving the registration information on the cluster from the client terminal 190 (Step S2302), the processing notification part 218 updates the management target table 250 based on the registration information (Step S2303), and brings the processing to an end. To be specific, the following processing is executed.

The processing notification part 218 adds a new entry to the management target table 250, and then stores necessary information in the added entry.

It should be noted that, although the processing notification part 218 executes the above-mentioned processing in this embodiment, the management server 100 may include a cluster registration part for executing processing of building the cluster. In this case, in Step S2303, the processing notification part 218 only needs to transmit the processing start instruction including the registration information on the cluster to the cluster registration part.

Figure 24:
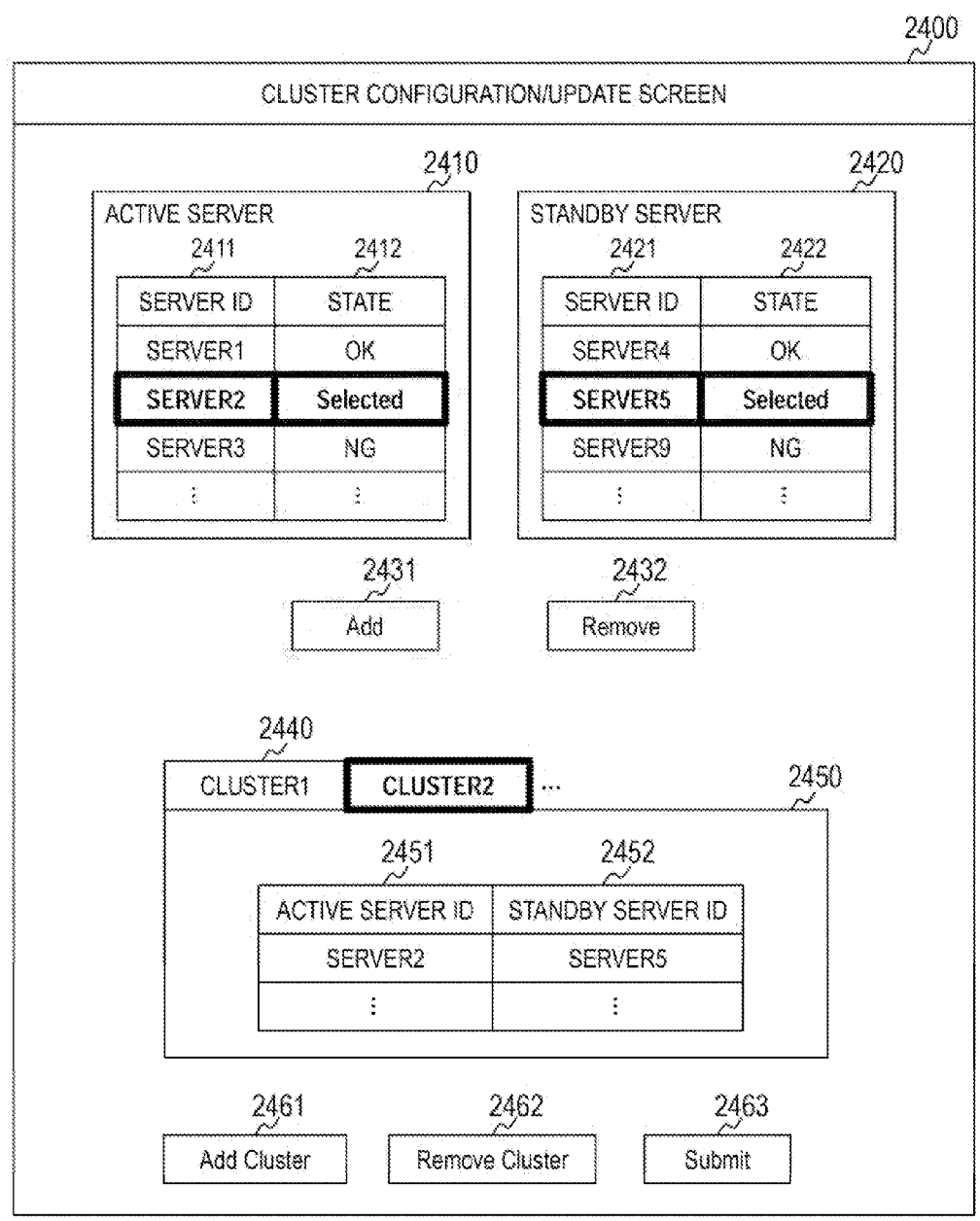
FIG. 24 is an explanatory diagram illustrating an example of an operation screen according to the eighth embodiment of this invention.

FIG. 24 is an explanatory diagram illustrating an example of the operation screen according to the eighth embodiment of this invention.

An operation screen 2400 displays information for newly building the cluster or updating the configuration of the cluster that has already been built. In this embodiment, the operation screen 2400 is displayed on the display of the client terminal 190. It should be noted that the operation screen 2400 may be displayed via the input/output apparatus of the management server 100. It should be noted that, as a display method, the management server 100 or the client terminal 190 uses a dedicated browser or program for display.

The operation screen 2400 includes an active server selection part 2410, a standby server selection part 2420, an "Add" button 2431, a "Remove" button 2432, a cluster selection part 2440, a cluster configuration display part 2450, an "Add Cluster" button 2461, a "Remove Cluster" button 2462, and a "Submit" button 2463.

The active server selection part 2410 is a display part for displaying information on the server 120 to be the candidate for the active server 120 for building the cluster. In the active server selection part 2410, a server ID 2411 and a state 2412 are displayed.

The server ID 2411 is an identifier of the server 120 to be the candidate for the active server 120. The state 2412 is information indicating whether or not the server in question can be registered in the cluster. In this embodiment, "OK" is displayed in the state 2412 in a case where the server in question can be registered in the cluster, "Selected" is displayed in the state 2412 in a case where the server in question is selected as the server 120 to be registered in the cluster, and "NG" is displayed in the state 2412 in a case where the server in question cannot be registered in the cluster.

The administrator can select the active server 120 for building the cluster from among the servers 120 displayed in the active server selection part 2410. In the example illustrated in FIG. 24, the server 120 having the server ID 2411 of "Server 2 " is selected. In addition, in the example illustrated in FIG. 24, the entry corresponding to the selected server 120 is highlighted.

The standby server selection part 2420 is a display part for displaying information on the server 120 to be the candidate for the standby server 120 for building the cluster. In the standby server selection part 2420, a server ID 2421 and a state 2422 are displayed.

The server ID 2421 is an identifier of the server 120 to be the candidate for the standby server 120. The state 2422 is information indicating whether or not the server in question can be registered in the cluster. The information displayed in the state 2422 is the same as the one displayed in the state 2421.

The administrator can select the standby server 120 for building the cluster from among the servers 120 displayed in the standby server selection part 2420. In the example illustrated in FIG. 24, the server 120 having the server ID 2421 of "Server 5 " is selected. In addition, in the example illustrated in FIG. 24, the entry corresponding to the selected server 120 is highlighted.

The cluster selection part 2440 is an operation button for selecting the cluster to which the server 120 is to be added. In a case where the cluster selection part 2440 is operated, the cluster in question is highlighted.

The cluster configuration display part 2450 is a display part for displaying the configuration of the cluster in question. In the cluster configuration display part 2450, an active server ID 2451 and a standby server ID 2452 are displayed.

The active server ID 2451 displays the identifier of the server 120 to be added as the active server 120. The standby server ID 2452 displays the identifier of the server 120 to be added as the standby server 120.

The "Add" button 2431 is an operation button for registering the server 120 selected in each of the active server selection part 2410 and the standby server selection part 2420 as the candidate for the server 120 to be added to the cluster. In a case where the administrator operates the "Add" button 2431, the selected server 120 is registered in the cluster configuration display part 2450.

The "Remove" button 2432 is an operation button for canceling the registration of the candidate server 120 to be added to the cluster. The administrator selects the server 120 whose registration is to be canceled from among the servers 120 displayed in the cluster configuration display part 2450, and then operates the "Remove" button 2432. In this manner, the selected server 120 is removed from the cluster configuration display part 2450.

The "Add Cluster" button 2461 is a button operated in a case where the cluster is to be newly built.

The "Remove Cluster" button 2462 is an operation button for removing the cluster selected in the cluster selection part 2440.

The "Submit" button 2463 is a button for determining the configuration of the cluster. In a case where the administrator operates the "Submit" button 2463, the cluster having the configuration of the server 120 displayed in the cluster configuration display part 2450 is built.

In this embodiment, in a case where the "Submit" button 2463 is operated, the client terminal 190 generates registration information including the identifier of the cluster displayed in the cluster selection part 2440 and the identifier of the server 120 displayed in the cluster configuration display part 2450, and transmits the generated registration information to the processing notification part 218.

According to the eighth embodiment, it is possible to present the candidate for the server 120 for building the cluster by confirming the configurations of the respective servers 120 in a case where the cluster is built. In this manner, the administrator can arbitrarily select an appropriate combination of the servers 120, and hence it is possible to reduce time and labor required for building the cluster.

<Ninth Embodiment>

In the first embodiment, the physical server 120 is used in order to build the cluster. In the ninth embodiment, however, a virtual server is used in order to build the cluster, which is a difference from the first embodiment.

The configuration of the computer system of the ninth embodiment and the hardware configuration and software configuration of the management server 100 and storage apparatus 130 of the ninth embodiment are the same as those described above, and descriptions thereof are therefore omitted. In the following, a description is given with a focus on the difference from the first embodiment.

In the ninth embodiment, the identifier of one of the server 120 and a virtual server 2500 is stored in the standby server ID 604 of the cluster check table 251.

Figure 25:
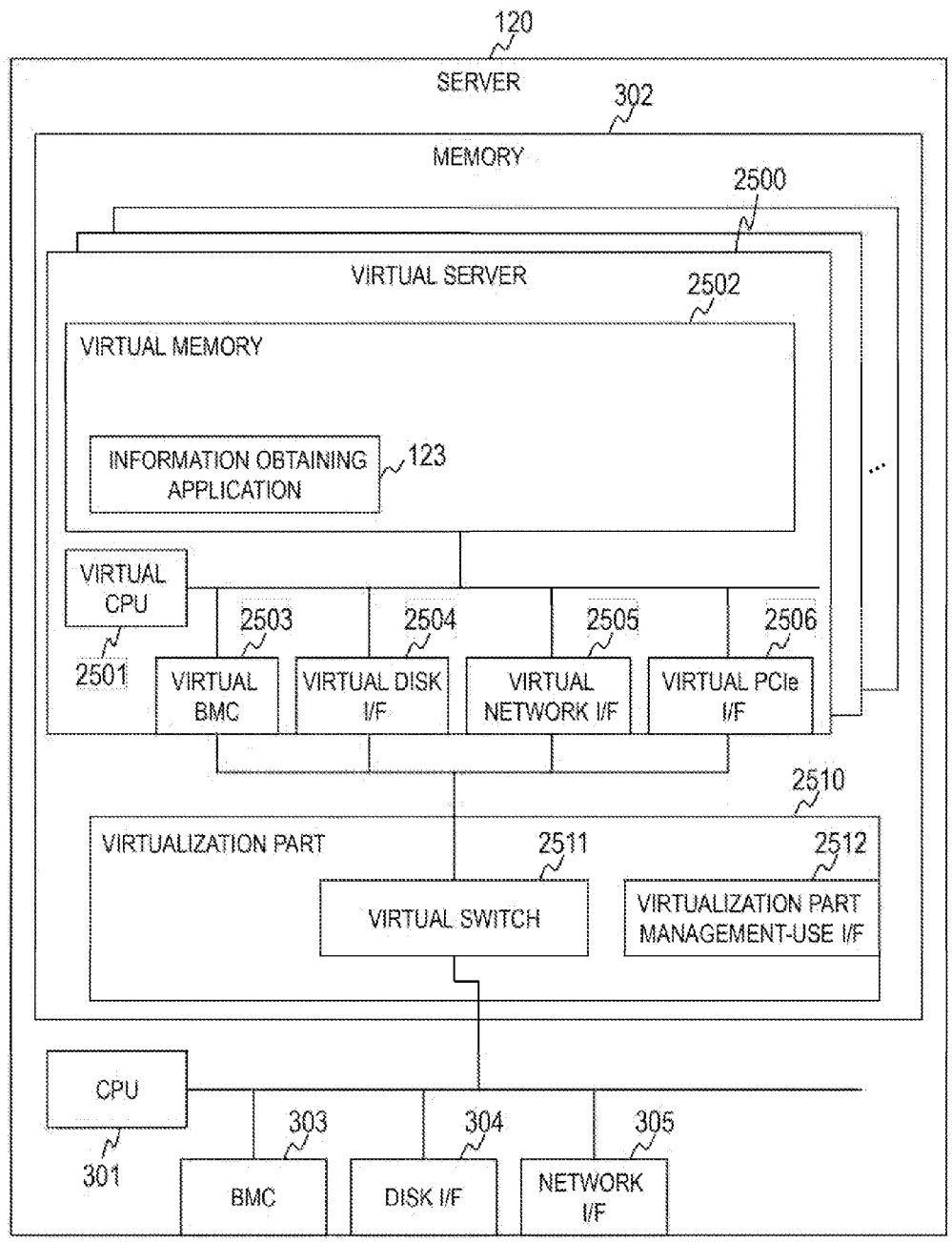
FIG. 25 is a block diagram illustrating the hardware configuration and software configuration of the server according to a ninth embodiment of this invention.

FIG. 25 is a block diagram illustrating the hardware configuration and software configuration of the server 120 according to the ninth embodiment of this invention.

In the ninth embodiment, the hardware configuration of the server 120 is the same as that of the first embodiment, but the software configuration of the server 120 differs from as that of the first embodiment.

In the memory 302, a program for implementing a virtualization part 2510 is stored. The virtualization part 2510 generates and manages at least one virtual server 2500. To be specific, the virtualization part 2510 virtually divides computer resources of the server 120 and allocates the divided computer resources to generate at least one virtual server 2500.

The virtualization part 2510 may conceivably be, for example, a hypervisor or virtual machine monitor (VMM).

The virtualization part 2510 includes a virtual switch 2511 and a virtualization part management-use interface 2512.

The virtual switch 2511 realizes communication among the virtual servers 2500 and communication between each virtual server 2500 and an external apparatus. To be specific, the virtual switch 2511 connects the adapter connected to a physical interface such as the network interface 305 to the virtual server 2500 to control the communication between each virtual server 2500 and the external apparatus.

The virtualization part management-use interface 2512 is a control interface for communicating to/from the management server 100. The virtualization part 2510 uses the virtualization part management-use interface 2512 to transmit information to the management server 100, and receive an instruction from the management server 100. The virtualization part 2510 may also be used directly from a user terminal or the like.

It should be noted that the virtualization part 2510 stores information associating the computer resources of the server 120 with virtual computer resources of the virtual server 2500, the configuration information on the virtual server 2500, a running history of the virtual server 2500, and the like.

The virtual server 2500 includes a virtual CPU 2501, a virtual memory 2502, a virtual BMC 2503, a virtual disk interface 2504, a virtual network interface 2505, and a virtual PCIe interface 2506.

The ninth embodiment differs in processing executed by the priority setting part 217.

Figure 26:
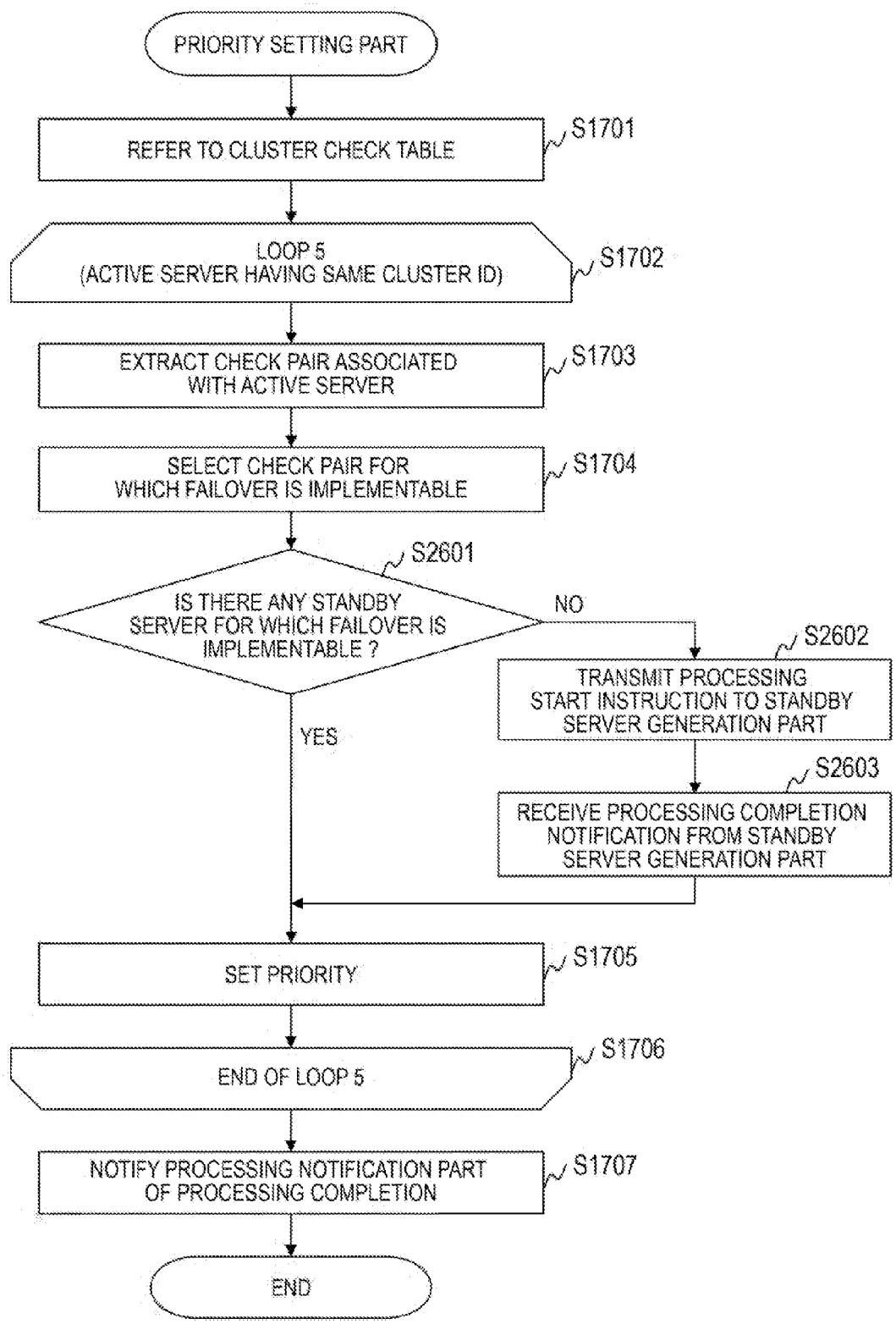
FIG. 26 is a flow chart illustrating an example of the processing executed by the priority setting part of the management server according to the ninth embodiment of this invention.

FIG. 26 is a flow chart illustrating an example of the processing executed by the priority setting part 217 of the management server 100 according to the ninth embodiment of this invention.

The processing from Steps S1701 and S1704 is the same as that of the first embodiment, and a description thereof is therefore omitted.

In the ninth embodiment, after Step S1704, the priority setting part 217 determines whether or not there is a check pair for which it is determined that the failover is implementable (Step S2601).

In a case where there is a check pair for which it is determined that the failover is implementable, the processing to be executed after this determination is the same as that of the first embodiment.

In a case where there is no check pair for which it is determined that the failover is implementable, the priority setting part 217 transmits the processing start instruction to the standby server generation part 219 (Step S2602). It should be noted that this instruction includes the identifier of the active server 120. The priority setting part 217 waits until receiving the processing completion notification from the standby server generation part 219.

In a case of receiving the processing completion notification from the standby server generation part 219 (Step S2603), the priority setting part 217 proceeds to Step S1706.

Details of the processing of Step S1706 are the same as those of the first embodiment, but differ from those of the first embodiment in that the standby server 120 forming the check pair is the virtual server 2500.

It should be noted that, in a case where the number of check pairs for which it is determined that the failover is implementable is a preset number of the standby servers 120 or less in Step S2601, the priority setting part 217 may transmit the processing start instruction to the standby server generation part 219. The number of the standby servers 120 required for building the cluster only needs to be set as the preset number of the standby servers 120.

Figure 27:
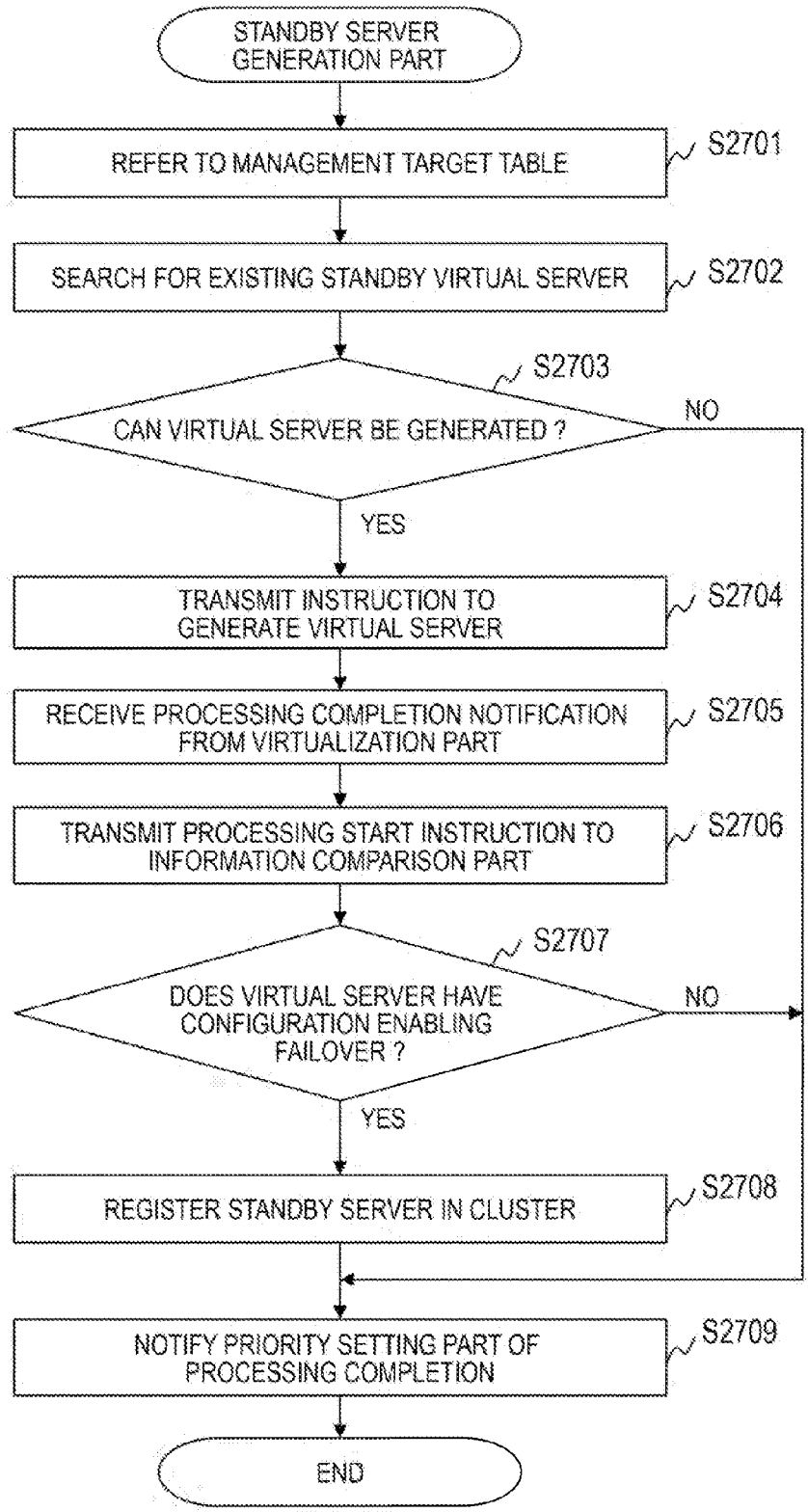
FIG. 27 is a flow chart illustrating an example of processing executed by a standby server generation part of the management server according to the ninth embodiment of this invention.

FIG. 27 is a flow chart illustrating an example of processing executed by the standby server generation part 219 of the management server 100 according to the ninth embodiment of this invention.

The standby server generation part 219 instructs the server 120 on which the virtualization part 2510 runs to generate the virtual server 2500 that is to serve as the standby server 120, and also instructs the server 120 to change the configuration of the virtual server 2500 to the one enabling the failover.

The virtual server 2500 generated as the standby server 120 is hereinafter also referred to as "standby virtual server 2500".

The standby server generation part 219 refers to the management target table 250 (Step S2701) to search for the entry of the standby virtual server 2500 (Step S2702).

The standby server generation part 219 determines whether or not it is possible to generate the virtual server 2500 for which the failover is implementable between the virtual server 2500 to be generated and the active server 120 corresponding to the identifier of the active server 120 included in the processing start instruction (Step S2703). To be specific, the following processing is executed.

The standby server generation part 219 searches for the entry matching the identifier of the active server 120 included in the processing start instruction. The standby server generation part 219 obtains the model 503 and configuration information 504 of the retrieved entry.

The standby server generation part 219 inquires of the virtualization part 2510 whether or not the configuration of the retrieved standby virtual server 2500 can be changed to the one enabling the failover. It should be noted that a conceivable method of specifying the virtualization part 2510 to which the inquiry is to be issued is the one in which the management server 100 stores information associating the identifier of the virtualization part 2510 with the identifier of the virtual server 2500 managed by the virtualization part 2510.

In a case of receiving a response indicating that the configuration of the standby virtual server 2500 can be changed to the one enabling the failover, the standby server generation part 219 determines that the virtual server 2500 for which the failover is implementable can be generated.

It should be noted that the standby server generation part 219 may issue an inquiry including the model 503 and configuration information 504 of the active server 120 to every virtualization part 2510 included in the computer system.

The processing of Step S2703 is as described above.

In a case where it is determined that the virtual server 2500 for which the failover is implementable cannot be generated, the standby server generation part 219 proceeds to Step S2709.

In a case where it is determined that the virtual server 2500 for which the failover is implementable can be generated, the standby server generation part 219 transmits to the virtualization part 2510 that has transmitted the response an instruction to generate the virtual server 2500 having a configuration requiring the failover (Step S2704). The standby server generation part 219 waits until receiving the processing completion notification from the virtualization part 2510.

The standby server generation part 219 receives the processing completion notification from the virtualization part 2510 (Step S2705). This notification includes the configuration information on the generated virtual server 2500. The standby server generation part 219 updates the management target table 250 based on the configuration information on the virtual server 2500 included in the instruction.

The standby server generation part 219 transmits the processing start instruction to the information comparison part 213 (Step S2706). It should be noted that this instruction includes the identifier of the active server 120 and the identifier of the standby virtual server 2500. The standby server generation part 219 waits until receiving the processing completion notification from the information comparison part 213.

In this case, the information comparison part 213 may omit the processing from Steps S1201 to S1205.

In a case of receiving the processing completion notification from the information comparison part 213, the standby server generation part 219 determines whether or not the failover is implementable between the active server 120 and the generated virtual server 2500 (Step S2707).

In a case where it is determined that the failover is not implementable, the standby server generation part 219 proceeds to Step S2709.

In a case where it is determined that the failover is implementable, the standby server generation part 219 adds the generated virtual server to the management target table 250 as the standby server 120 (Step S2708). The following two methods are conceivable as a method of adding the virtual server 2500.

In a case where there is an entry for the virtual server 2500 in the management target table 250, the standby server generation part 219 updates information of the column to be updated of the entry in question. In a case where there is no entry for the virtual server 2500 in the management target table 250, the standby server generation part 219 adds a new entry to the management target table 250, and stores necessary information in the added entry.

It should be noted that the processing of adding the virtual server 2500 to the management target table 250 may be executed by the cluster registration part (not shown) or the like.

The standby server generation part 219 transmits the processing completion notification to the priority setting part 217 (Step S2709), and brings the processing to an end.

According to the ninth embodiment, by using the virtual server 2500 as the standby server 120, it is possible to build the cluster without changing the configuration of the server 120 and a path coupling the active server 120 to the LU 135.

It should be noted that different kinds of software exemplified in the embodiments can be stored in different kinds of, for example, electromagnetic, electronic, and optical recording media (for example, non-transitory storage media), and can be downloaded onto the computer through a communication network such as the Internet.

Each of the descriptions of the embodiments is directed to the example of using the control in a software manner, but part thereof can be realized in a hardware manner.

This invention has been described in detail so far with reference to the accompanying drawings, but this invention is not limited to those specific configurations described above, and various changes and equivalent components are included within the gist of the scope of claims appended.

What is claimed is:

1. A system redundancy verification method, which is to be executed in a computer system,
    the computer system comprising at least one first computer, at least one second computer, a storage system, and a management computer for managing the at least one first computer and the at least one second computer,
    the at least one first computer including a first processor, a first memory coupled to the first processor, and a first I/O interface coupled to the first processor,
    the at least one second computer including a second processor, a second memory coupled to the second processor, and a second interface coupled to the second processor,
    the storage system including a disk controller and a plurality of storage media, the disk controller including at least one controller each including at least one port,
    the management computer including a third processor, a third memory coupled to the third processor, and a third I/O interface coupled to the third processor,
    the at least one first computer being configured to execute a service,
    the at least one second computer being configured to take over the service, in a case where a failure occurs on the at least one first computer,
    the storage system being configured to provide the at least one first computer with a storage area for storing data necessary for executing the service,
    the system redundancy verification method including:
    a first step of obtaining, the management computer, first hardware information on a hardware configuration of the at least one first computer and second hardware information on a hardware configuration of the at least one second computer;

a second step of obtaining, by the management computer, first storage area information on the storage area provided to the at least one first computer;

a third step of transmitting, by the management computer, an instruction to obtain second storage area information an the storage area provided to the at least one first computer to the at least one second computer;

a fourth step of obtaining, by the at least one second computer, in a case of receiving the obtaining instruction, the second storage area information from the storage system, and transmitting the obtained second storage area information to the management computer; and a fifth step of comparing, by the management computer, the obtained first hardware information and the obtained first storage area information with the obtained second hardware information and the obtained second storage area information, and determining whether a failover is implementable between the at least one first computer and the at least one second computer based on a result of the comparison.

2. The system redundancy verification method according to claim 1, wherein the fifth step includes:

comparing the first hardware information with the second hardware information to determine whether the at least one second computer has the hardware configuration enabling the failover; and comparing the first storage area information with the second storage area information to determine whether the at least one second computer is accessible to the storage area for storing data necessary for taking over the service.

3. The system redundancy verification method according to claim 2, wherein the at least one second computer includes an information obtaining module for obtaining the second storage area information, and wherein the fourth step includes:

activating, by the at least one second computer, the information obtaining module in a case of receiving the obtaining instruction;

inquiring, by the information obtaining module, of the storage system to obtain, as the second storage area information, information on a storage area that is accessible by the at least one second computer within the storage area provided to the at least one first computer;

transmitting, by the information obtaining module, the obtained second storage area information to the management computer; and stopping, by the at least one second computer, the at least one second computer after processing executed by the information obtaining module is finished.

4. The system redundancy verification method according to claim 3, wherein the fourth step further includes:

calculating, by the information obtaining module, an obtaining time from the inquiring of the storage system to the obtaining of the second storage area information; and transmitting, by the information obtaining module, the obtained second storage area information and the calculated obtaining time to the management computer, and wherein the system redundancy verification method further includes setting, by the management computer, in a case where there are a plurality of second computers for which it is determined that the failover is implementable, for the plurality of second computers for which it is determined that the failover is implementable, a priority indicating a use order of each of the plurality of second computers to be used when the failover is executed based on the obtaining times received from the plurality of second computers.

5. The system redundancy verification method according to claim 3, further including:

obtaining, by the management computer, in a case where there are a plurality of second computers for which it is determined that the failover is implementable, a performance of a port, which is used when each of the plurality of second computers accesses the storage system; and setting, by the management computer, for the plurality of second computers for which it is determined that the failover is implementable, a priority indicating a use order of the each of the plurality of second computers to be used when the failover is executed based on the obtained performance of the port.

6. The system redundancy verification method according to claim 3, further including:

obtaining, by the management computer, in a case where there are a plurality of second computers for which it is determined that the failover is implementable, a cost of a path coupling each of the plurality of second computers and the storage system to each other; and setting, by the management computer, for the plurality of second computers for which it is determined that the failover is implementable, a priority indicating a use order of the each of the plurality of second computers to be used when the failover is executed based on the obtained cost.

7. The system redundancy verification method according to claim 3, further including:

displaying, by the management computer, the at least one first computer and a second computer for which it is determined that the failover is implementable between the second computer and the at least one first computer; and building, by the management computer, in a case where an operation based on the displaying is received, a redundant system by using at least one first computer and at least one second computer that are selected by the operation.

8. The system redundancy verification method according to claim 3, wherein the at least one second computer includes a virtualization part for generating a virtual machine by using a computer resource, wherein the virtual machine generated by the virtualization part is configured to take over the service, and wherein the system redundancy verification method further includes:

determining, by the management computer, whether there is a second computer for which the failover is implementable;

transmitting, by the management computer, an instruction to generate the virtual machine for which the failover is implementable to the at least one second computer, in a case where it is determined that there is no second computer for which the failover is implementable;

generating, by the at least one second computer, the virtual machine for which the failover is implementable based on the instruction, in a case of receiving the instruction to generate the virtual machine; and building, by the management computer, a redundant system by using the at least one first computer and the generated virtual machine.

9. The system redundancy verification method according to claim 2,
wherein the computer system includes an information obtaining module for obtaining the second storage area information, and
wherein the fourth step includes:
obtaining, by the at least one second computer, the information obtaining module, in a case of receiving the obtaining instruction;
executing, by the at least one second computer, the obtained information obtaining module;
inquiring, by the information obtaining module, of the storage system to obtain, as the second storage area information, information on a storage area that is accessible by the at least one second computer within the storage area provided to the at least one first computer;
transmitting, by the information obtaining module, the obtained second storage area information to the management computer; and
stopping, by the at least one second computer, the at least one second computer after processing executed by the information obtaining module is finished.

10. A computer system, comprising at least one first computer, at least one second computer, a storage system, and a management computer for managing the at least one first computer and the at least one second computer,
the at least one first computer including a first processor, a first memory coupled to the first processor, and a first I/O interface coupled to the first processor,
the at least one second computer including a second processor, a second memory coupled to the second processor, and a second I/O interface coupled to the second processor,
the storage system including a disk controller and a plurality of storage media, the disk controller including at least one controller each including at least one port,
the management computer including a third processor, a third memory coupled to the third processor, and a third I/O interface coupled to the third processor,
the at least one first computer being configured to execute a service,
the at least one second computer being configured to take over the service, in a case where a failure occurs on the at least one first computer,
the storage system being configured to provide the at least one first computer with a storage area for storing data necessary for executing the service,
the management computer further including:
a control part for determining whether a failover is implementable between the at least one first computer and the at least one second computer; and
management information for storing configuration information on the at least one first computer and configuration information on the at least one second computer,
the control part being configured to:
refer to the management information to obtain first hardware information on hardware of the at least one first computer and second hardware information on hardware of the at least one second computer;
refer to the management information to obtain first storage area information on the storage area provided to the at least one first computer; and transmit an instruction to obtain second storage area information on the storage area provided to the at least one first computer to the at least one second computer,
the at least one second computer being configured to obtain the second storage area information from the storage system, and transmit the obtained second storage area information to the management computer, in a case of receiving the obtaining instruction,
the control part being further configured to:
compare the obtained first hardware information and the obtained first storage area information with the obtained second hardware information and the obtained second storage area information; and
determine, based on a result of the comparison, whether the failover is implementable between the at least one first computer and the at least one second computer.

11. The computer system according to claim 10, wherein the control part is further configured to:
compare the first hardware information with the second hardware information to determine whether the at least one second computer has a hardware configuration enabling the failover, in a case of determining whether the failover is implementable between the at least one first computer and the at least one second computer; and
compare the first storage area information with the second storage area information to determine whether the at least one second computer is accessible to the storage area for storing data necessary for taking over the service.

12. The computer system according to claim 11,
wherein the at least one second computer includes an information obtaining part for obtaining the second storage area information,
wherein the at least one second computer is further configured to activate the information obtaining part, in a case of receiving the obtaining instruction,
wherein the activated information obtaining part is configured to:
inquire of the storage system to obtain, as the second storage area information, information on a storage area that is accessible by the at least one second computer within the storage area provided to the at least one first computer; and
transmit the obtained second storage area information to the management computer, and
wherein the at least one second computer is further configured to stop the at least one second computer after processing executed by the information obtaining part is finished.

13. The computer system according to claim 12,
wherein the information obtaining part is further configured to:
calculate an obtaining time from the inquiring of the storage system to the obtaining of the second storage area information; and
transmit the obtained second storage area information and the calculated obtaining time to the management computer, and
wherein the control part is further configured to set, in a case where there are a plurality of second computers for which it is determined that the failover is implementable, for the plurality of second computers for which it is determined that the failover is implementable, a priority indicating a use order of each of the plurality of second computers to he used when the failover is executed based on the obtaining times received from the plurality of second computers.

14. The computer system according to claim 12, wherein the control part is further configured to:
- obtain, in a case where there are a plurality of second computers for which it is determined that the failover is implementable, a performance of a port, which is used when each of the plurality of second computers accesses the storage system; and
- set, for the plurality of second computers for which it is determined that the failover is implementable, a priority indicating a use order of the each of the plurality of second computers to be used when the failover is executed based on the obtained performance of the port.

15. The computer system according to claim 12, wherein the control part is further configured to:
- obtain, in a case where there are a plurality of second computers for which it is determined that the failover is implementable, a cost of a path coupling each of the plurality of second computers and the storage system to each other; and
- set, for the plurality of second computers for which it is determined that the failover is implementable, a priority indicating a use order of the each of the plurality of second computers to be used when the failover is executed based on the obtained cost.

\* \* \* \* \*